United States Patent
Burt et al.

(10) Patent No.: US 11,936,791 B2
(45) Date of Patent: Mar. 19, 2024

(54) VERIFICATION OF THE RELIABILITY OF SOFTWARE AND DEVICES AGAINST ASSERTIONS AND GUARANTEES

(71) Applicants: Jason Burt, Seattle, WA (US); Robert McIver, Seattle, WA (US)

(72) Inventors: Jason Burt, Seattle, WA (US); Robert McIver, Seattle, WA (US)

(*) Notice: Subject to any disclaimer, the term of this patent is extended or adjusted under 35 U.S.C. 154(b) by 40 days.

(21) Appl. No.: 17/478,831

(22) Filed: Sep. 17, 2021

(65) Prior Publication Data

US 2022/0094551 A1    Mar. 24, 2022

Related U.S. Application Data

(60) Provisional application No. 63/081,221, filed on Sep. 21, 2020.

(51) Int. Cl.
*H04L 9/32* (2006.01)
*G06F 8/61* (2018.01)

(52) U.S. Cl.
CPC .............. *H04L 9/3236* (2013.01); *G06F 8/63* (2013.01)

(58) Field of Classification Search
CPC ................................ G06F 8/63; H04L 9/3236
See application file for complete search history.

(56) References Cited

U.S. PATENT DOCUMENTS

| | | | |
|---|---|---|---|
| 9,959,410 B2 * | 5/2018 | He | G06F 9/45533 |
| 10,491,384 B2 * | 11/2019 | French | H04L 9/0861 |
| 2009/0282262 A1 * | 11/2009 | Nonoyama | H04L 9/0897 |
| | | | 713/189 |
| 2015/0135163 A1 * | 5/2015 | Mun | G06F 8/71 |
| | | | 717/120 |
| 2016/0105280 A1 * | 4/2016 | Kinshumann | H04L 9/3234 |
| | | | 713/166 |
| 2017/0331635 A1 * | 11/2017 | Barinov | H04L 9/0643 |

(Continued)

FOREIGN PATENT DOCUMENTS

| | | | | |
|---|---|---|---|---|
| CN | 105071936 B | * | 10/2018 | ......... G06F 21/6209 |
| CN | 105741879 B | * | 3/2019 | |

(Continued)

OTHER PUBLICATIONS

Zhou et al., "A Software Reconfigurable Assertion Checking Unit for Run-Time Error Detection", 2018, IEEE (Year: 2018).*

(Continued)

*Primary Examiner* — Wei Y Zhen
*Assistant Examiner* — Junchun Wu

(57) ABSTRACT

Computer systems, devices, and associated methods of verifying reliability of instructions for a device are disclosed herein. In one embodiment, a method includes identifying a reliability requirement associated with instructions for a device and receiving, from a user, an assertion in relation to the reliability requirement. The method includes generating a cryptographic assertion tracer (CAT) based at least in part on the received assertion. The method includes receiving assertion-related instructions in association with the CAT and generating a first code verification encrypted reproducible record based at least in part on the CAT and the received assertion-related instructions. The method then includes reporting that the reliability requirement is addressed.

18 Claims, 17 Drawing Sheets

(56) References Cited

U.S. PATENT DOCUMENTS

| | | | | |
|---|---|---|---|---|
| 2017/0339518 | A1* | 11/2017 | Do | H04W 4/185 |
| 2019/0318103 | A1* | 10/2019 | Anton | G06Q 20/0655 |
| 2019/0333096 | A1* | 10/2019 | Johnson | G06Q 30/0248 |
| 2021/0099772 | A1* | 4/2021 | Lee | H04N 21/845 |
| 2021/0328801 | A1* | 10/2021 | Sly | G06V 40/168 |
| 2021/0365539 | A1* | 11/2021 | Fiske | H04L 9/3066 |
| 2022/0094551 | A1* | 3/2022 | Burt | G06F 11/36 |

FOREIGN PATENT DOCUMENTS

| | | | | |
|---|---|---|---|---|
| CN | 109560934 A | * | 4/2019 | H04L 9/3236 |
| CN | 111709829 A | * | 9/2020 | |
| CN | 109313685 B | * | 6/2021 | G06F 21/51 |
| CN | 114499895 A | * | 5/2022 | |
| KR | 20180064279 A | * | 6/2018 | |
| TW | 201539014 A | * | 10/2015 | G01S 19/215 |

OTHER PUBLICATIONS

Nakka et al., "An Architectural Framework for Providing Reliability and Security Support", 2004, IEEE (Year: 2004).*

Kakkad et al., "Biometric authentication and image encryption for image security in cloud framework", May 2019, Springer (Year: 2019).*

Acar et al., "Comparing the Usability of Cryptographic APIs", 2017, IEEE (Year: 2017).*

Mozaffari-Kermani et al., "Reliable Hash Trees for Post-quantum Stateless Cryptographic Hash-based Signatures", 2015, IEEE (Year: 2015).*

Willis, John; Security and Compliance Theater—The Seventh Deadly Disease; QCon San Francisco, Mar. 9, 2020, InfoQ (https://www.infoq.com/presentations/security-compliance/), United States. (Last accessed Mar. 1, 2023, printout attached).

Chockaiyan, Raji; Powering Capital One's Microservices Journey with CICD Pipelines, Leveraging Microservices Architecture to Increase Delivery Speed, Without Compromising Quality; Capital One (https://www.capitalone.com/tech/software-engineering/realigning-devops-practices-to-support-microservices/), Nov. 11, 2019, United States. (Last accessed Mar. 1, 2023, printout attached).

* cited by examiner

VERIFICATION OF THE RELIABILITY OF SOFTWARE AND DEVICES AGAINST ASSERTIONS AND GUARANTEES

CROSS-REFERENCE TO RELATED APPLICATION

This application claims priority to and the benefit of U.S. Provisional Patent Application No. 63/081,221, entitled "VERIFICATION OF THE RELIABILITY OF SOFTWARE AND DEVICES AGAINST ASSERTIONS AND GUARANTEES," filed Sep. 21, 2020, which is hereby incorporated by reference in its entirety.

BACKGROUND

In the purchase of cameras, planes, and other devices that require software reliability, it is difficult to verify the reliability of a device's software without access to the code running on the device and relevant internal auditing materials. For a developer of a product that includes such a device, the process for accessing potential issues in software of the device is treated as a siloed process. However, many problems can arise when the software of such a device is unreliable. For example, problems can arise from the interaction of the device with new services created by the team developing the product. As another example, the core software of the device can include dependencies that change as a result of an action by a creator of the device or a third party. These issues are compounded as software development for these devices is moving to a more agile process where software on a device can be consistently updated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A device can be associated with reliability requirements, which can comprise individual statements of reliability associated with the device. The reliability requirements can be received from or created by a developer of instructions for a device, a partner developer, a customer of the developer, a regulator, an attorney for the developer, a government or government entity, a third party auditor, and/or the like. For example, a reliability requirement for a device, which is based on a government security requirement, might be to randomly generate a unique password at the startup of a new device.

Several embodiments of the disclosed technology can track and verify that a reliability requirement for a device has been addressed in instructions for the device. Several embodiments of the disclosed technology can additionally track where in the instructions for the device the reliability requirement has been addressed. Several embodiments of the disclosed technology can cryptographically prove an assertion of a party with respect to a reliability requirement for a device at a given point in time. In certain embodiments, a reliability ensurer can receive, from a developer that is developing instructions for a target device, via a user interface, an assertion in relation to a reliability requirement. For example, to address a reliability requirement that a unique password be randomly generated for a new device, an assertion received from a developer of a target device can include a statement of the action taken by the developer to address the reliability requirement, e.g.: "Added password generator feature on boot of new device."

The reliability ensurer can then generate a cryptographic assertion tracer ("CAT") for the received assertion. In certain embodiments, the CAT comprises an encrypted string value comprising the received assertion, such as a hash of the received assertion. The CAT can be used for verifying the assertion and tracking that the reliability requirement has been addressed in instructions for the target device. In certain embodiments, the CAT can be displayed to the developer via a user interface for tracking the assertion in instructions for the target device.

The assertion received for the reliability requirement can be tracked during development of the instructions for the target device. In certain embodiments, the CAT can be copied into instructions for the target device at a location in the instructions that address the reliability requirement. For example, in some embodiments, the CAT can be included in the instructions as a comment at a location in the instructions relative to assertion-related instructions that address the reliability requirement. For example, to track the assertion from the above example, the CAT can be added as a comment immediately before the instructions that perform the function of generating a random unique password on startup of a new device. In certain embodiments, the CAT can be associated with assertion-related instructions in other ways, such as in metadata associated with the assertion-related instructions and/or metadata associated with a file that includes the assertion-related instructions.

The reliability ensurer can then receive assertion-related instructions that address the reliability requirement. In certain embodiments, the reliability ensurer can receive assertion-related instructions submitted by the developer via a user interface generated by the reliability ensurer. In certain embodiments, the reliability ensurer can receive assertion-related instructions based at least in part upon a selection by the developer of a portion of instructions that address the reliability requirement. For example, in some embodiments, an application running in a development environment of the instructions can receive a selection of assertion-related instructions and a request by a developer to associate the selected instructions with the CAT. The reliability ensurer can receive the CAT and the associated assertion-related instructions via the reliability agent.

Sometimes multiple discrete instructions or groups of instructions address a reliability requirement and are located in separate locations in the instructions. The reliability ensurer can be configured to receive multiple discrete assertion-related instructions or groups of assertion-related instructions associated with a CAT generated for an assertion. The CAT can be tracked in the instructions by including the CAT in one or more locations in the instructions that address the reliability requirement.

In certain embodiments, a reliability agent can be configured to automatically search for and identify assertion-related instructions that address a reliability requirement. For example, the reliability agent can automatically identify assertion-related instructions based at least in part on a comparison of instructions and example instructions from another section of the instructions identified by the developer, or based on instructions identified by a pattern matching tool. For instance, the reliability agent can track all states that an image of instructions could take as a result of feature flags in the instructions and automatically identify assertion-related instructions for all of the states based on a developer's selection of an example of assertion-related instructions for one state. In some embodiments, rules for identifying assertion-related instructions associated with a reliability requirement can be received from a third party that does not have access to the instructions, enabling the third party to help identify assertion-related instructions for a reliability requirement.

The reliability ensurer can then generate a code verification encrypted reproducible record ("ERR"). In some embodiments, a code verification ERR is generated based at least in part on the CAT and the received assertion-related instructions. In certain embodiments, the code verification ERR can be generated by encrypting a concatenation of the CAT and the assertion-related instructions. In certain embodiments, the code verification ERR can comprise a hash of a concatenation of the CAT and the assertion-related instructions run through an encryption algorithm. For example, in some embodiments, the concatenation of the CAT and assertion-related instructions can be encrypted using, for example, bcrypt to create an encrypted string. In some embodiments, the reliability ensurer can be configured to generate the code verification ERR based on an encryption algorithm including generating a random portion of text, similar to a one-time pad, for each record an individual would want to create that acts as a cypher, and the combined text could be run against this encrypted cypher at a later time to reproduce the record. In certain embodiments, a code verification ERR is generated based at least in part on a received assertion and assertion-related instructions.

In some embodiments, the assertion-related instructions used for generating the code verification ERR comprise a string value comprising source code of the assertion related instructions. In some embodiments, the assertion-related instructions can comprise a hash of source code of the assertion-related instructions or of a file that includes the assertion-related instructions. For example, in certain embodiments, the assertion-related instructions can comprise a checksum generated by a system that tracks code versions for the instructions. In some embodiments, the assertion-related instructions comprise metadata associated with the assertion-related instructions. In some embodiments, the assertion-related instructions received by the reliability ensurer include an encrypted value generated based at least in part on the assertion-related instructions (e.g., a checksum) and include no plaintext of the assertion-related instructions.

The CAT can be traced in development environments and systems, such as those that use a checksum based system to track code versions, such as Git. When the instructions that include the CAT are committed, the checksum is uniquely generated for the instructions including the CAT in the instructions. Accordingly, versions of instructions can be tracked in association with an attestation by the developer that the identified assertion-related instructions address a specific reliability requirement, verifiable by the reliability ensurer.

The CAT, being a unique identifier associated with a received assertion in relation to a reliability requirement, can act as a clear link between the assertion that addresses the reliability requirement and changes to instructions. If the assertion is changed or assertion-related instructions are modified, the developer would need to re-verify that the assertion-related instructions address the assertion, and, hence, the reliability requirement. Otherwise, the code verification ERR associated with the reliability requirement would no longer match a newly-generated code verification ERR based on the CAT and the modified state of the assertion-related instructions.

In some embodiments, the reliability ensurer can be configured to verify whether assertion-related instructions have been modified. For example, the reliability ensurer can detect modifications based at least in part on a comparison between a code verification ERR generated using the most recently generated CAT associated with a reliability requirement and an ERR generated based at least in part on that CAT and a present state of the assertion-related instructions used for generating the code verification ERR. In response to determining that the code verification ERRs are different, the reliability ensurer can be configured to generate an alert indicating that the assertion that the reliability requirement is addressed is no longer valid. In some embodiments, the ensurer agent can be configured to detect a modification in assertion-related instructions or a file that includes assertion-related instructions, and the ensurer agent can automatically capture a present state of assertion-related instructions that the reliability ensurer can use for verifying an associated code verification ERR.

If an assertion is received with respect to a reliability requirement, but no assertion-related instructions are received in association with a CAT generated based on the assertion, the reliability ensurer can determine that the reliability requirement is not addressed. The reliability ensurer can determine that the reliability requirement is addressed when assertion-related instructions are received with reference to the CAT. One additional advantage of using a CAT to track assertion-related instructions, according to some embodiments, is improved security as a consequence of the CAT being a unique value unassociated in the instructions with the assertion or reliability requirement, in case the instructions or a document, such as a test file, or information related to the instructions, is compromised. Associating assertion-related instructions and a reliability requirement as described above can be useful throughout the development of a target device, including in developing instructions for the device, when setting configuration at the operating system level of the device, during integration testing, performance testing, functional testing, and establishing system settings. Indeed, in some embodiments, assertion-related instructions can comprise test logs, certificates, and other associated information related to the instructions. Once the software development cycle is complete, an image of instructions for the target device is built. The reliability ensurer can receive image data associated with the image and generate an image verification ERR based at least in part on code verification ERRs respectively generated in relation to reliability requirements for the device and the image data. In certain embodiments, the reliability ensurer can generate an image verification ERR based at least in part on encrypting a concatenation of code verification ERRs associated with instructions for the target device and the image data. For instance, when instructions for the target device are built prior to distribution of the instructions to the target device, a checksum based system or encryption program (e.g., Pretty Good Privacy ("PGP")) can be used to sign the image that is generated from the compiled code. The image data used by the reliability ensurer to generate the code verification ERR can comprise the checksum or PGP key. In certain embodiments, the reliability agent can automatically capture the image data for the reliability ensurer to use in generating the image verification ERR. In certain embodiments, the reliability ensurer can receive the image data via an input field in a user interface.

In some embodiments, the reliability ensurer can be configured to generate multiple image verification ERRs, each respectively associated with different states that an image built using instructions for the device can take. For example, as a consequence of a feature flag in instructions for a device, the instructions can comprise multiple different states that the image can be run in. In some embodiments, the reliability ensurer can generate an image verification ERR for each of the multiple states for the instructions.

The reliability ensurer can verify that the image of the instructions that is to be pushed to the target device meets the reliability requirements for the target device. For instance, in certain embodiments, assertion-related instructions received with respect to reliability requirements can comprise checksums generated by a code management system (e.g., Github), and image data can comprise a checksum generated by an image management system (e.g., Artifactory), which the reliability ensurer uses for generating the image verification ERR. This image verification ERR can be linked with the code verification ERRs by the checksums generated from the instructions. Accordingly, the assertions received with respect to reliability requirements can be verified against the final instruction package used for generating the image, and the image verification ERR that is generated can be used for verification of a complete audit trail. For instance, a third party, such as an auditor or customer of the developer of the instructions for the target device, can do a lookup on all the reliability requirements, received assertions made by developers, and assertion-related instructions associated with the image of device instructions.

The reliability ensurer can further be configured to verify that correct software was deployed to a target device and that it is running in a guaranteed state. For example, the reliability agent can generate all of the various states that instructions for the device might take, based on features identified in the instructions for the target device as well as states that the image of the instructions can be set in. As an example, for an image that has two sets of instructions, and each set of instructions has three features, there would be six states that the image could be configured to run in. Similar to features, instructions for the device could run machine learning models with different states. For example, a machine learning model could be built that identifies cats and people's faces. That the device actually stores the output of cats or people's faces could be a reliability requirement that an assertion can be created against, which can be tracked. Another reliability requirement might be to ensure that instructions for the device don't save specific types of data or send specific data to external locations from where the instructions run.

In response to the image of instructions for the target device being pushed to the target device, the reliability ensurer can generate a device verification ERR. In certain embodiments, the reliability ensurer can receive a device identifier, such as a MAC address of the target device. The reliability ensurer can generate the device verification ERR based at least in part on the device identifier and the image verification ERR. In some embodiments, the device verification ERR can be generated based at least in part on encrypting a concatenation of the device identifier and the image verification ERR. In certain embodiments, the reliability ensurer can receive a device identifier from a software deployment tool, such as one developed by Balena Inc.

A target device can run multiple types of instructions and images of instructions, so all code verification ERRs and the image verification ERRs for instructions deployed on the target device can be checked against the target device. When the instructions and/or images are ready to be deployed to a target device, the software update can be registered as a device verification ERR. Network, hardware, and location properties of the device such as IP address, geographic location of the device, and MAC Address can be combined with deployment tools that track versions of software releases to create a confirmation of when an updated device meets customer or state or local standards. For example a camera product might have implemented a facial masking tool to be enabled on a device in San Francisco and disabled everywhere else. Instead of building two machine learning models, the producers of the device can build one machine learning model and add a facial filtering service on the device before the video is processed by the machine learning agent. This would require three checks from the reliability ensurer, one in the development of the code to outline that feature flag was created, two that the version of software was deployed to that device, and three that the device was set in that mode. The mode could be sent as an assertion, and a third party auditing service can review the assertion and code and approve it.

Several embodiments of the disclosed technology can verify whether instructions for a device meet a reliability requirement and assertion of reliability regarding the instructions. Several embodiments of the disclosed technology can verify whether a device was updated with instructions that meet an assertion of reliability in a reasonable time.

A benefit according to embodiments of the disclosed technology is that an auditor can be provided with reliability requirements and if no code verification ERR has been generated for a reliability requirement, the auditor can easily determine that the reliability requirement has not been addressed. Another benefit according to embodiments of the disclosed technology is that an auditor can verify that a reliability requirement has been addressed based on a stored code verification ERR associated with the reliability requirement and a received assertion, but if assertion-related instructions associated with the code verification ERR are changed, a newly-generated code verification ERR based on the current assertion-related instructions would not match the verified code verification ERR, and the auditor would be alerted that the reliability requirement is unaddressed. Another benefit according to embodiments of the disclosed technology is for detecting fraud and outlier assertions using an aggregate of code verification ERRs, including, for example, when a partner developer alleges that instructions are being updated to address reliability requirements, but few reliability requirements are being readdressed by the partner developer, which can be inferred by few code verification ERRs being regenerated in relation to the reliability requirements.

Another benefit according to embodiments of the disclosed technology is that if an assertion received in relation to a reliability requirement remains unchanged but associated assertion-related instructions are modified, creating a bug, a new assertion can be created off the bug to include code and an output of a test file. Another benefit according to embodiments of the disclosed technology is that a developer could make a requirement that all reliability requirements associated with instructions for a device be addressed before a device is updated with a new image of instructions. Another benefit according to embodiments of the disclosed technology is a quality manager for a hosting service could audit reliability requirements based on ERRs associated with the reliability requirements for an image of instructions before including the image in a marketplace. For example, if a new feature flag was added in the instructions, a new reliability requirement associated with the new feature flag could be associated with the instructions, and a developer would have to address the new reliability requirement. Another benefit according to embodiments of the disclosed technology is a quality control manager could create reliability requirements directed toward feature flags in instructions, which change the instruction's operation, requiring that the reliability requirements be addressed by identifying and describing all the modes of operation. Another benefit according to embodiments of the disclosed technology is deployment of an image to devices could be blocked if a reliability requirement is unaddressed. Another benefit according to embodiments of the disclosed technology is that all reliability requirements, image verification ERRs, code verification ERRs, and received assertions can be provided for a device based on a device identifier used for creating a device verification ERR.

DETAILED DESCRIPTION

Certain embodiments of systems, devices, components, modules, routines, data structures, and processes for ensuring reliability of device instructions are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-9.

As used herein, the term "reliability requirement," generally refers to a declaration that a device or instructions for the device is to meet. A reliability requirement may comprise or relate to a rule, policy, law, regulation, covenant, contractual obligation, design specification, or the like. For example, a reliability requirement can include: "Device does not collect personal data if the user is less than 18 years old."

As used herein, the term "assertion," generally refers to input from a user in relation to a reliability requirement, comprising a statement regarding the reliability requirement being addressed. For example, in some embodiments, an assertion comprises a string value.

As used herein, the term "cryptographic assertion tracer ('CAT')," generally refers to a unique value, such as cryptographic output (e.g., a hash), generated based at least in part on receiving an assertion that a reliability requirement is addressed. In some embodiments, a CAT comprises a hash of an assertion comprising a string value that was received with respect to a reliability requirement.

As used herein, the term "encrypted reproducible record ('ERR')," generally refers to a cryptographic output generated based at least in part on input including an assertion in relation to a reliability requirement. For example, a code verification ERR can be generated based at least in part on a CAT and assertion-related instructions, an image verification ERR can be generated based at least in part on a code verification ERR and image data, and a device verification ERR can be generated based at least in part on an image verification ERR and device data.

As used herein, the terms "instructions for a target device" and "device instructions," generally refers to source code, which can include configuration settings, that, when compiled, can be installed and run on a device.

Figure 1A:
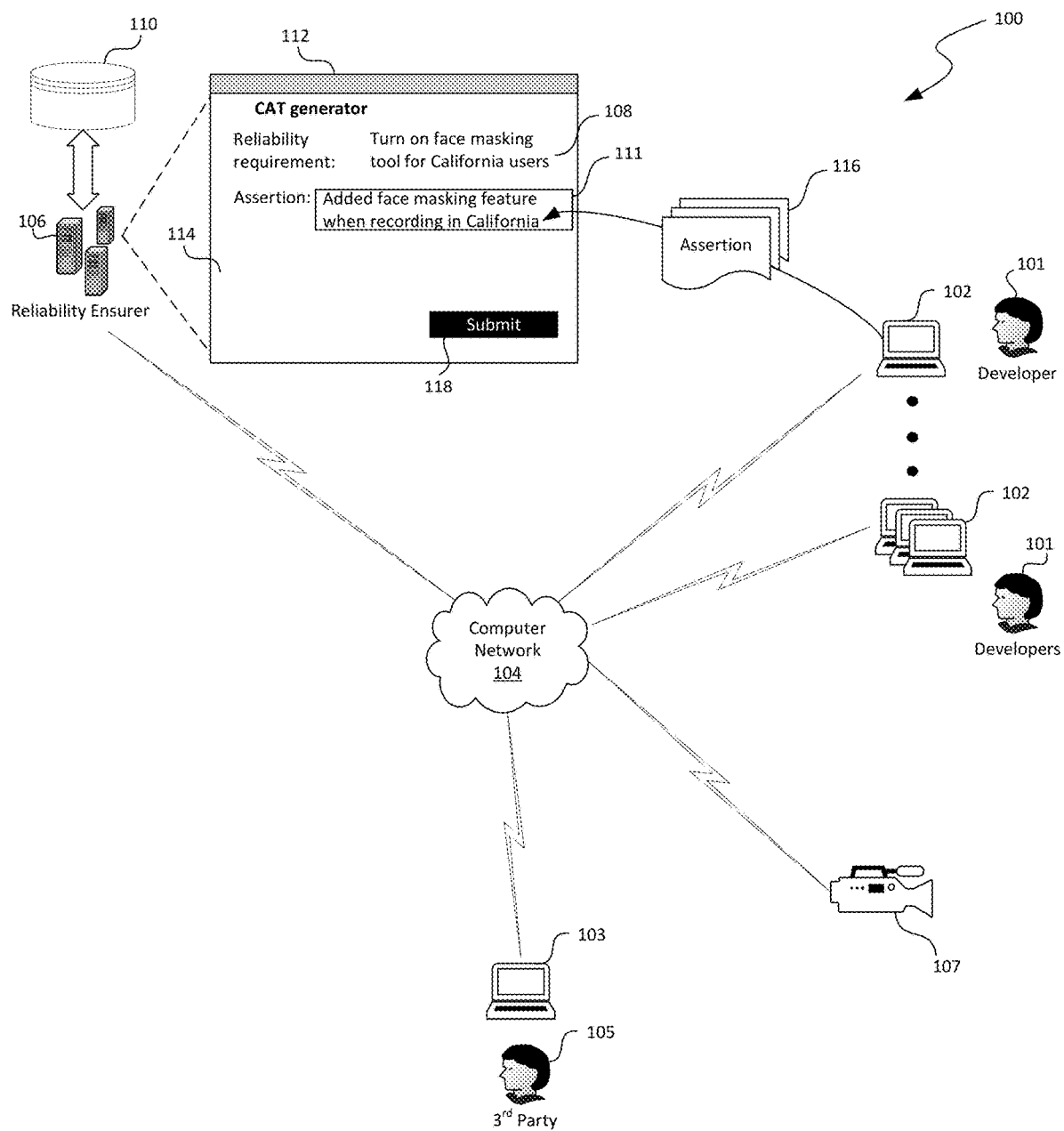
FIGS. 1A-1H are schematic diagrams illustrating a computing system implementing reliability ensuring of device instructions during stages of operation in accordance with embodiments of the disclosed technology.

FIGS. 1A-1H are schematic diagrams illustrating a computing system 100 implementing reliability ensuring of instructions for a target device 107 during stages of operation, in accordance with embodiments of the disclosed technology. As shown in FIG. 1A, the computing system 100 can include a reliability ensurer 106, at least one developer device 102, a third party device 103, and at least one target device 107 interconnected by a computer network 104. The computer network 104 can include an enterprise intranet, a wide area network, the Internet, or other suitable types of network.

Even though particular components and associated arrangements of the computing system 100 are shown in FIGS. 1A-1H, in other embodiments, the computing system 100 can include additional and/or different components. For example, in certain embodiments, the reliability ensurer 106 and/or the at least one developer device 102 can be interconnected via the network 104 with a distributed version-control system (not shown) for receiving and tracking changes in source instructions for a device during software development, such as Git. In some embodiments, the reliability ensurer 106 can contain multiple servers and/or be integrated into a single computing system. In other embodiments, the computing system 100 can also include caching servers, load balancers, or other suitable components. In the description below, techniques of reliability ensuring are described as implemented on the reliability ensurer 106 for illustration purposes. In certain embodiments, some or all of the techniques disclosed herein can also be implemented on one or more other servers in the computing system 100 or on the at least one developer device 102.

The developer device 102 and the third party device 103 can individually include a computing device that facilitates access to the reliability ensurer 106 via the computer network 104 by a developer 101 and a third party 105, respectively. In the illustrative embodiment, the developer device 102 and the third party device 103 individually include a laptop computer. In other embodiments, the developer device 102 and/or the third party device 103 can also include smartphones or other suitable computing devices. Even though the developer 101 and third party 105 are shown in FIGS. 1A-1H for illustration purposes, in other embodiments, the computing system 100 can facilitate any suitable number of developers 101 and third parties 105 to access the reliability ensurer 106 via the computer network 104. For example, the reliability ensurer 106 can be configured to receive an assertion directed to a respective reliability requirement from each of multiple different developers 101 via multiple different devices 102 in a collaborative software development process.

The reliability ensurer 106 can be configured to ensure the reliability of instructions for the target device 107. The developer device 102 can be configured to execute one or more applications for modifying the instructions for the target device 107. For example, in some embodiments, the developer device 102 can be configured to execute applications that enable the developer 101 to modify instructions for the target device 107 in a continuous integration development practice. In some embodiments, the developer device 102 can be configured to execute applications that enable the developer 101 to push a completed build of instructions to the target device 107. In some embodiments, the developer device 102 can be configured to interact with a third party service or device (not shown) that facilitates hosting and versioning of the instructions for the target device 107 (e.g., Github). In some embodiments, the developer device 102 can be configured to interact with a third party service or device (not shown) that facilitates deploying the instructions for the target device 107 to the target device 107.

The target device 107 shown in the illustrative example of FIGS. 1A-1H is a network-connected video camera. In some embodiments, the target device 107 can comprise multiple devices, such as a fleet of Internet of things (IoT) devices. In some embodiments, the target device 107 can comprise another type of device other than a network-connected video recorder, such as a smart television, a smart speaker, a smartwatch, a gaming console, a digital media player, a smart appliance, a smart thermostat, a medical device, a vehicle, a smartphone, a laptop, a traffic camera, a drone, a set-top box, or another IoT device.

The reliability ensurer 106 can be configured to execute one or more applications 112 configured to facilitate receiving an assertion 116 from the developer 101. In the illustrated embodiment, the application 112 is configured to provide a user interface, for example, a webpage 114 to the developer 101 upon request. As shown in FIG. 1A, the webpage 114 can be configured to show a reliability requirement 108 for which the assertion 116 is received in relation to. In some embodiments, the application 112 can be configured to generate a user interface (not shown) that includes a list of reliability requirements that are associated with instructions for the target device 107, and the application 112 can be configured to receive input from the developer 101 of a selection, via the developer device 102, of a reliability requirement from the list for which an assertion is to be received in relation to.

The webpage 114 can be configured to include an input field 111 configured to facilitate receiving the assertion 116 from the developer 101. For example, in some embodiments, as shown in FIG. 1A, the input field 111 can comprise a text box for receiving the assertion 116 comprising a string value, for example, "Added face masking feature when recording California users," in FIG. 1A.

Figure 1B:
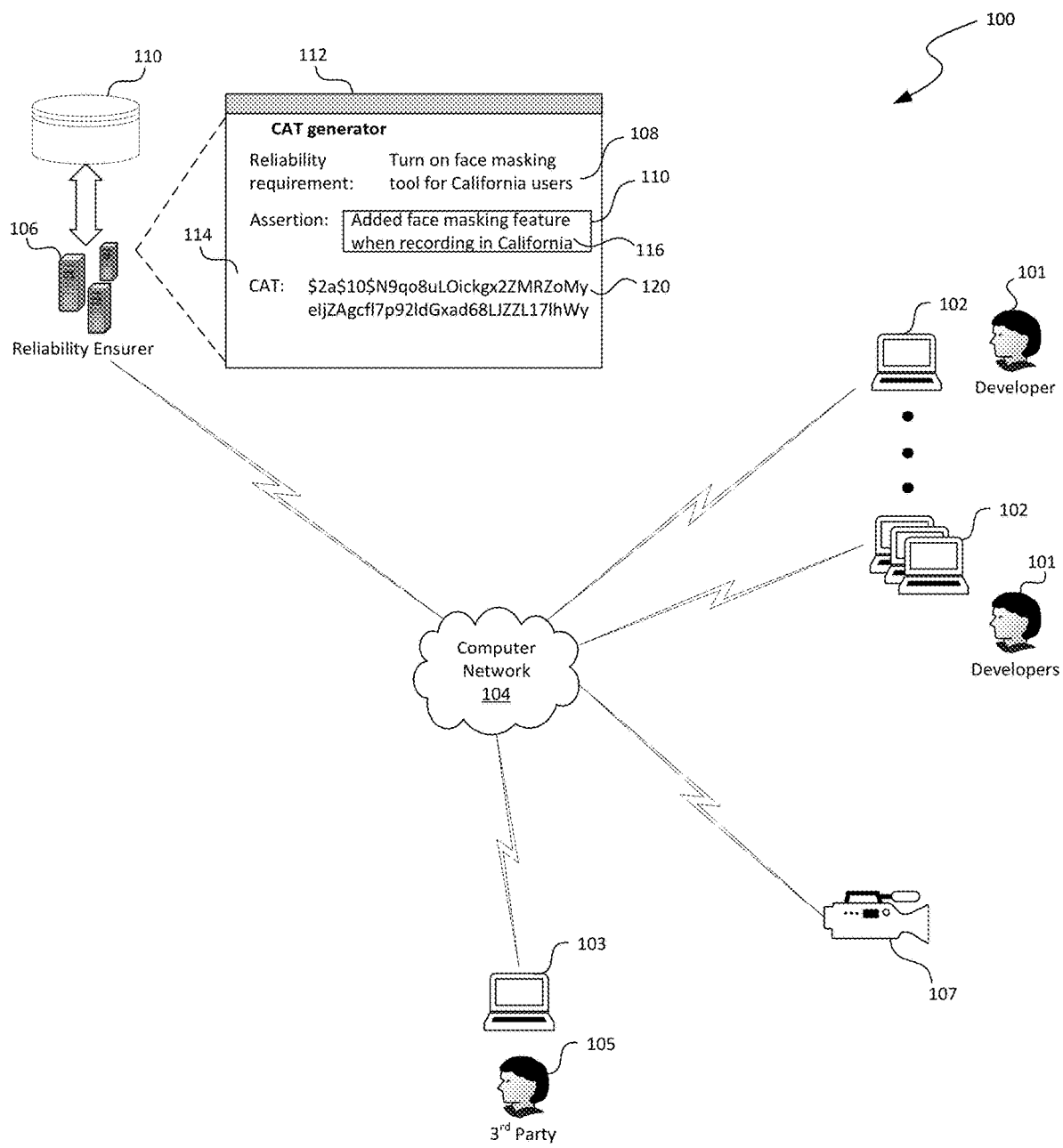

In the illustrated example in FIG. 1A, upon receiving a string value comprising the assertion 116 via the input field 111, and upon actuation of a submit button 118 by the developer 101 via the developer device 102, the application 112 can be configured to receive the assertion 116. As shown in FIG. 1B, in response to receiving the assertion 116, the application 112 can be configured to provide a CAT 120, which can be generated by the reliability ensurer 106 based at least in part on the received assertion 116. For example, in some embodiments, the CAT 120 can comprise a hash of the received assertion 116. The reliability ensurer 106 can be configured to store the CAT 120 in association with the received assertion 116 and the reliability requirement 108 in the database 110.

In the illustrated embodiment, the CAT 120 can be generated based at least in part on the received assertion 116. In other embodiments, the CAT 120 can comprise another unique identifier generated by the reliability ensurer 106 in response to receiving an assertion from the developer 101 with respect to the reliability requirement 108. For example, in some embodiments, the CAT 120 can comprise a unique random number generated by the reliability ensurer 106. For instance, in certain embodiments, the input field 111 can comprise a check box rather than a text box, and an assertion received from the developer 101 can comprise a selection of the check box by the developer 101. In response to receiving the selection of the check box, the reliability ensurer 106 could be configured to generate a CAT comprising a unique random number.

The assertion 116 submitted by the developer 101 can be addressed in instructions for the target device 107. For example, in some embodiments, the reliability ensurer 106 can receive the assertion 116 after the developer 101 has verified that instructions for the target device 107 address the reliability requirement 108, or after the developer 101 has modified the instructions to address the reliability requirement 108.

Figure 1C:
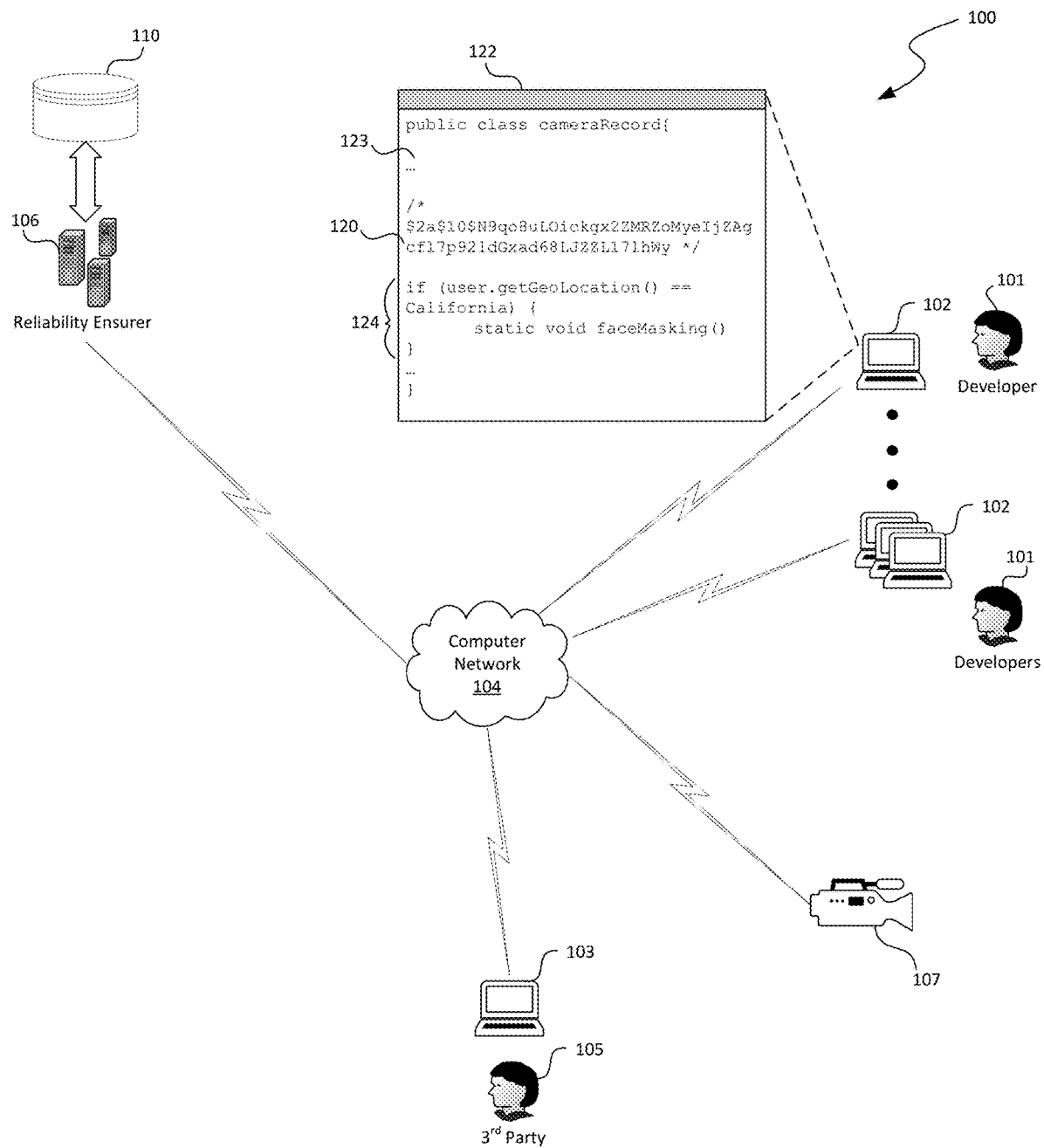

As shown in FIG. 1C, the developer device 102 can be configured to execute one or more applications 122 configured to facilitate reviewing and modifying instructions 123 for the target device 107. For example, in some embodiments, the application 122 can comprise a text editor. In some embodiments, the assertion 116 can be tracked in the instructions 123 based at least in part on an association between the CAT 120 and assertion-related instructions 124.

In some embodiments, an association between the CAT 120 and the assertion-related instructions 124 can be created based at least in part on input from the developer 101 received via the developer device 102. For example, in the illustrated embodiment, the application 122 has received input from the developer 101, via the developer device 102, of the CAT 120 as a comment in the instructions 123 above the assertion-related instructions 124. In some embodiments, multiple portions of instructions 123 can address the reliability requirement 108, and the application 122 can be configured to receive input from the developer 101 for associating the CAT 120 and each of the multiple assertion-related portions of the instructions 123. For example, in the illustrated example, the application 122 may receive input from the developer 102 in instructions for function "faceMasking" as well, associating the CAT 120 and the portion of instructions comprising function "faceMasking."

In some embodiments, the one or more applications 122 shown in FIG. 1C can be configured to generate an interface (not shown) configured to facilitate receiving input from the developer 101 for associating the CAT 120 and the assertion-related instructions 124 in other ways. For example, in some embodiments, the one or more applications 122 can be configured to receive input of the CAT 120 from the developer 101 via a CAT input field (not shown), receive a selection by the developer 101 of the assertion-related instructions 124, and create an association between the instructions 124 and the CAT 120 based at based at least in part on that input received from the developer 101. In such an embodiment, the one or more applications 122 can be configured to associate the CAT 120 and the selected portion of instructions by adding the CAT to metadata associated with the instructions or automatically as a comment in the instructions. In some embodiments, the CAT 120 can be imported by the application 122 directly from the reliability ensurer 106, rather than being inputted by the developer 101.

In some embodiments, the one or more applications 122 can be configured to automatically search for and identify the assertion-related instructions 124 from among other instructions for the device. For example, in some embodiments, the application 122 can be configured to identify the assertion-related instructions 124 automatically based at least in part on identifying the most recent changes made by the developer 101 to the instructions.

In some embodiments, the application 122 can be configured to identify the assertion-related instructions 124 automatically based at least in part on identifying a predefined pattern, condition, or configuration in the instructions 123. In some embodiments the predefined pattern, condition, or configuration in the instructions 123 can be defined by a third party or an administrator. In certain embodiments, the application 122 can be configured to automatically identify the assertion-related instructions 124 based at least in part on received training data. For example, the application 122 can be configured to identify the assertion-related instructions 124 based at least in part on examples of instructions received from another party.

In some embodiments, the application 122 can be configured to automatically identify the assertion-related instructions 124 from among other instructions based at least in part on the assertion 116 received from the developer 101. For example, in some embodiments, the application 122 can be configured to receive the assertion 116 from the reliability ensurer 106 and compare the assertion 116 with assertions received from developers in relation to instructions for other devices. The application 122 can be configured to identify, based on the comparison, a previously-received assertion that is similar to the received assertion 116, identify assertion related instructions associated with the previously-received assertion, compare the assertion-related instructions associated with the previously-received assertion and the instructions 123 for the target device 107, and automatically identify, based on the comparison, the assertion-related instructions 124 based at least on their similarity with the assertion-related instructions associated with the previously-received assertion.

In some embodiments, the application 122 can be configured to automatically identify other assertion-related instructions that are associated with the CAT 120 in addition to the assertion-related instructions 124 that have been identified by the developer 101. For example, in some embodiments, the application 122 can be configured to identify other assertion-related instructions by comparing the assertion-related instructions 124 identified by the developer 101 and other instructions for the target device 107. For instance, the application 122 can track all states that the instructions could take as a result of feature flags in the instructions and automatically identify assertion-related instructions in all of the states of the instructions based on the identified assertion-related instructions 124.

In some embodiments, at least some instructions for the target device 107 can be encrypted, and the application 122 can be configured to identify assertion-related instructions in the encrypted instructions. For example, in some embodiments, the application 122 can be configured to use Bayesian machine learning and input from an auditor of the instructions to automatically identify assertion-related instructions in encrypted instructions. In some embodiments, the application 122 can be configured to use an encryption method on instructions to automatically search for and identify assertion-related instructions in encrypted instructions for the target device 107. For example, in certain embodiments, the application 122 can be configured to receive input of example assertion-related instructions by the developer, and the application 122 can be configured to encrypt the assertion-related instructions using an encryption scheme that was used for encrypting encrypted instructions for the target device 107, and the application 122 can be configured to identify assertion-related instructions in the encrypted instructions for the target device 107 based at least in part on a comparison of the encrypted example assertion-related instructions and the encrypted instructions for the target device 107.

The reliability ensurer 106 can be configured to receive the assertion-related instructions associated with the CAT 124. In some embodiments, the one or more applications 122 can be configured to facilitate receiving the assertion-related instructions 124. For example, in the illustrated embodiment shown in FIG. 1D, the one or more applications 122 can be configured to receive a selection of the assertion-related instructions 124, and upon actuation of a "Submit selected code in association with the CAT ending in 171hWy" button 118 by the developer 101 via the developer device 102, the application 122 can be configured to receive the assertion-related instructions 124 and provide the assertion-related instructions to reliability ensurer 106. In other embodiments, the one or more applications 122 can be configured to facilitate receiving insertion-related instructions by capturing the assertion-related instructions associated with the CAT 124 that has been included as a comment in the instructions and providing the captured assertion-related instructions to the reliability ensurer 106. In other embodiments, the application 112 (FIG. 1B) can be configured to receive assertion-related instructions 124 based on input by the developer 101 of the assertion-related instructions 124 in an assertion-related instructions input field (not shown), comprising a text box, of the webpage 114.

In some embodiments, the assertion-related instructions 124 received by the reliability ensurer 106 can include data in addition to text of the assertion-related instructions 124. For example, in some embodiments, assertion-related instructions 124 can comprise metadata associated with the assertion-related instructions 124. The one or more applications 122 can be configured to facilitate receiving metadata associated with the assertion-related instructions 124. For example, in some embodiments, the one or more applications 122 can be configured to capture metadata associated with the assertion-related instructions. In some embodiments, metadata associated with assertion-related instructions can comprise at least one of the following: a location in a file system or repository of the assertion-related instructions 124, a location in a file of the assertion-related instructions 124, a file size or type of the file that includes the assertion-related instructions 124, a managing system of a version control system (e.g, Git Repo on GitHub), a file name that includes the assertion-related instructions 124, a commit hash associated with the assertion-related instructions 124, and an identifier for the developer 101 (e.g., a username). In some embodiments, the one or more applications 122 can be configured to encrypt the assertion-related instructions 124 and/or the metadata, and the reliability ensurer 106 can be configured to receive encrypted assertion-related instructions 124.

In some embodiments, the reliability ensurer 106 can be configured to receive and store the assertion-related instructions 124, and any associated metadata, in the database 110. For example, in some embodiments the reliability ensurer 106 can be configured to store the assertion-related instructions 124 and associated metadata in association with the assertion 116, CAT 120, and reliability requirement 108. In some embodiments, the assertion-related instructions 124 are not stored in the database. In some embodiments, metadata associated with the assertion-related instructions can be stored in the database 110 but not source code comprising the assertion-related instructions.

The reliability ensurer 106 is configured to generate a code verification ERR. In some embodiments, the reliability ensurer 106 can be configured to generate a code verification ERR based at least in part on the CAT 120 and the assertion-related instructions 124. The reliability ensurer 106 can be configured to store the generated code verification ERR in the database 110 in association with the CAT 120, the assertion 116, and the reliability requirement 108. In some embodiments, the reliability ensurer 106 can be configured to generate a code verification ERR based at least in part on the CAT 120, the received assertion-related instructions 124, and at least some metadata included in the assertion-related instructions 124. For example, in some embodiments, a code verification ERR is generated based at least in part on a commit hash associated with the assertion-related instructions 124. In some embodiments, the reliability ensurer 106 can be configured to generate a code verification ERR based at least in part on the assertion 116 and the assertion-related instructions 124.

In some embodiments, the reliability ensurer 106 can be configured to generate multiple code verification ERRs that it associates with a reliability requirement. For example, in some embodiments, the reliability ensurer 106 can receive multiple portions of assertion-related instructions, each portion received in association with a CAT, and generate a respective code verification ERR based at least in part on the CAT and each respective portion of assertion-related instructions. For instance, in some embodiments, because of a feature flag, instructions for the target device 107 may include different states that an image of the instructions can run in, and the reliability ensurer can receive a CAT in association with assertion-related instructions of each of the multiple states, and generate a code verification ERR for each of the multiple states based at least in part on the respective assertion-related instructions of each state.

The stages of operation illustrated in the FIGS. 1A-D can be repeated with respect to multiple different reliability requirements associated with instructions for the target device 107. For example, in some embodiments, the reliability ensurer 106 can be configured to receive assertions from multiple developers 101 with respect to other reliability requirements associated with the target device 107, generate respective CATs in response to the received assertions, and generate respective code verification ERRs based at least in part on the respective CATs and respective assertion-related instructions. Accordingly, the reliability ensurer 106 can be configured to generate multiple code verification ERRs associated with the instructions for the target device 107, each associated with a reliability requirement for the target device 107. In some embodiments, the developer 101 can comprise multiple different developers that respectively have access to different instructions for the target device 107.

The reliability ensurer 106 can further be configured to verify whether a reliability requirement has been addressed. In some embodiments, the reliability ensurer 106 can be configured to verify whether a previously addressed reliability requirement is currently addressed. For example, in some embodiments, the reliability ensurer 106 can be configured to verify whether a reliability requirement is currently addressed based at least in part on generating a new code verification ERR based on a latest-generated CAT associated with the reliability requirement and a current state of the assertion-related instructions associated with a stored code verification ERR, and comparing the new code verification ERR to the stored code verification ERR. When the code verification ERRs do not match, the reliability ensurer 106 can determine that the reliability requirement is not addressed.

Figure 1D:
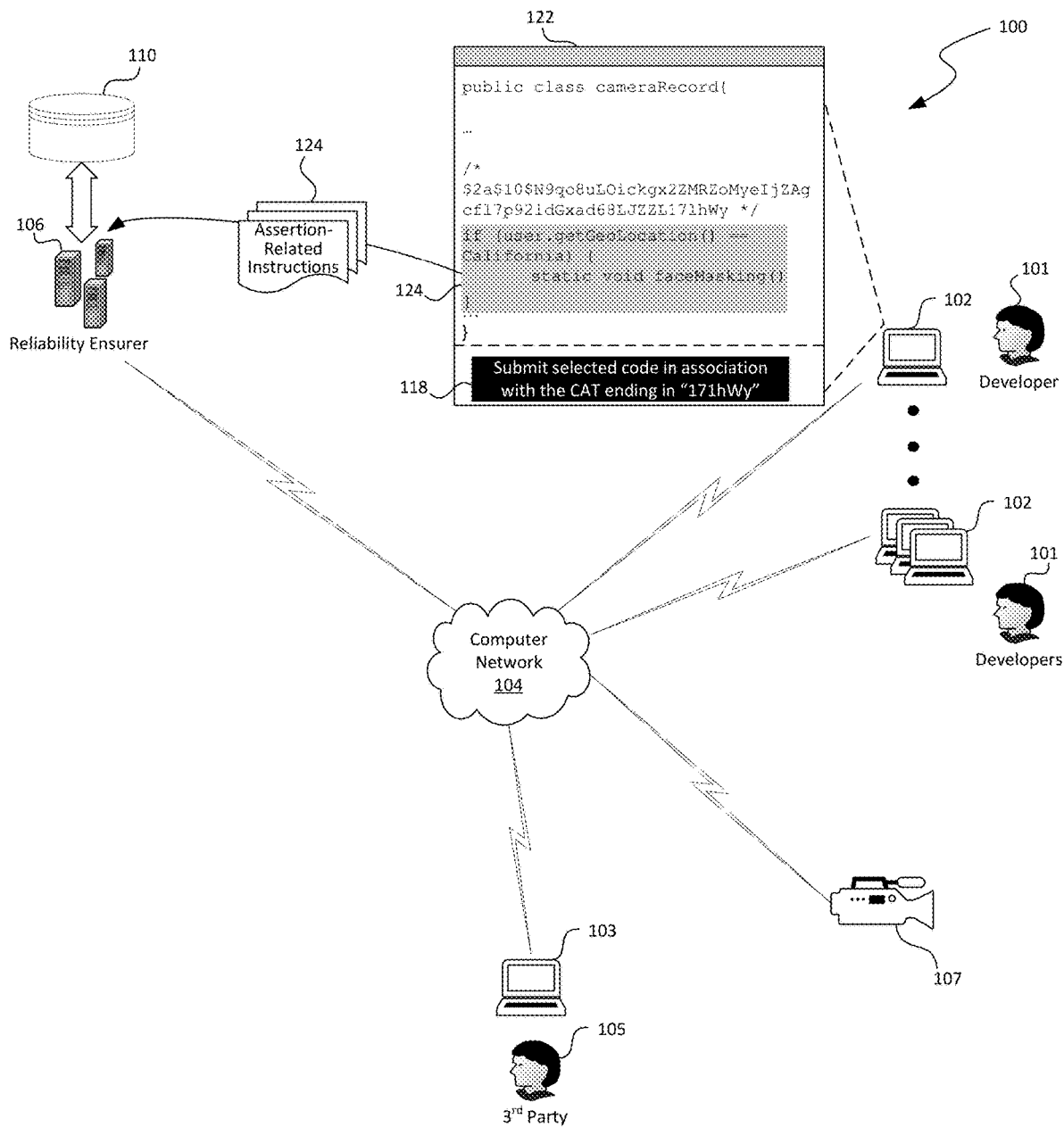
Figure 1E:
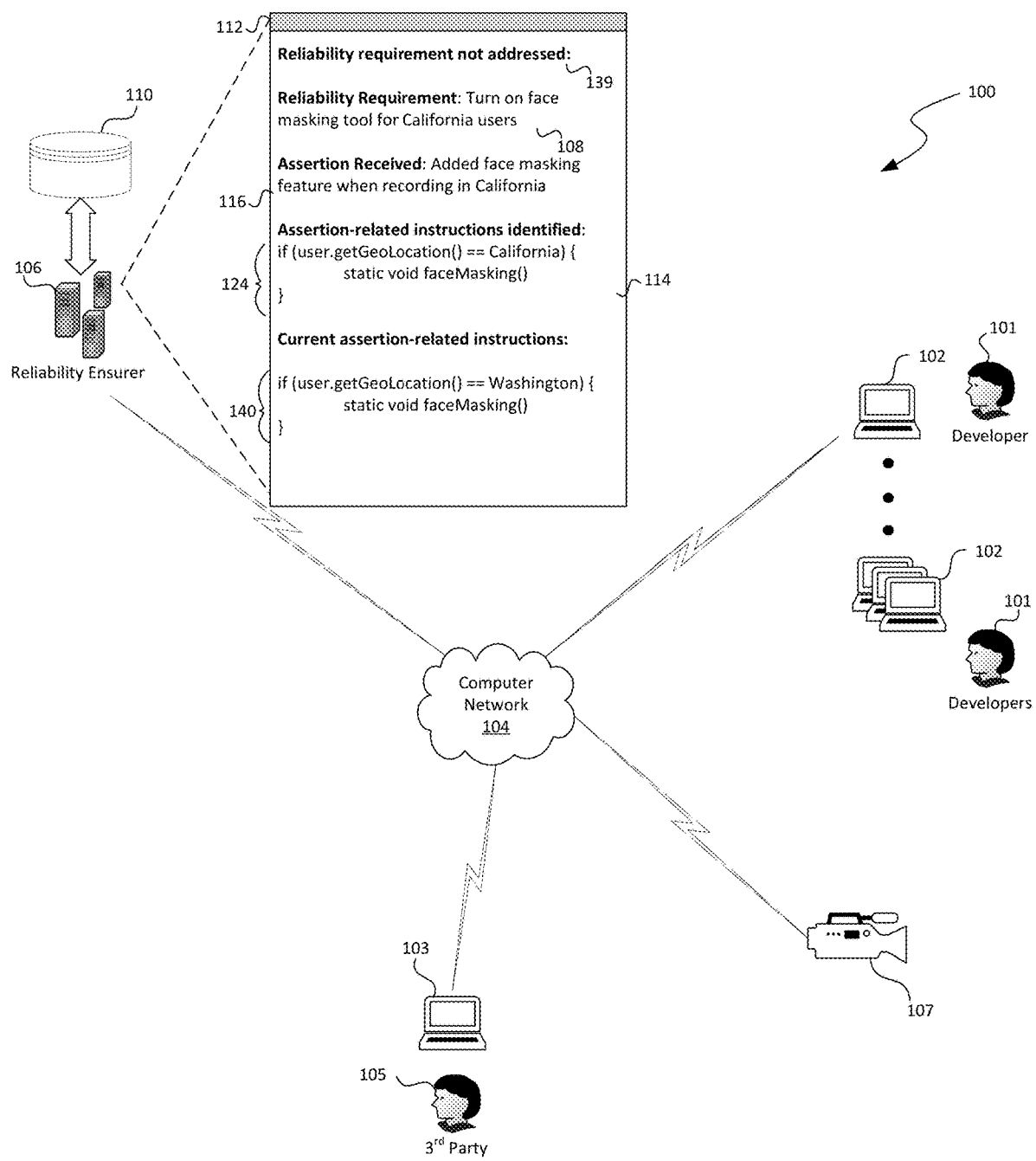

In some embodiments, the reliability ensurer 106 can generate an alert that it communicates to the developer 101 indicating that the reliability requirement is not being addressed. FIG. 1E shows the application 112 showing the webpage 114, including an alert 139 that the reliability requirement 108 is not addressed. The webpage 114 can show the reliability requirement 108, the assertion 116 received in relation to the reliability requirement, the assertion-related instructions 124 associated with the stored code verification ERR, and current assertion-related instructions 140. In some embodiments, the assertion-related instructions 124 can be obtained by decrypting the stored code verification ERR. As shown in FIG. 1E, the current assertion-related instructions 140 have changed relative to the received assertion-related instructions 124 used for generating the saved code verification ERR associated with the reliability requirement 108. Accordingly, the reliability ensurer 106 has determined that the reliability requirement is not addressed.

In some embodiments, the reliability ensurer 106 can be configured to verify a code verification ERR associated with a reliability requirement at various times. In some embodiments, a code verification ERR can be verified when assertion-related instructions have changed. For example, the developer device 102 can be configured to track assertion-related instructions and capture a copy of the assertion-related instructions when it detects a change to the instructions. If the developer 102 does not re-verify that the assertion-related instructions address the reliability requirement, such as by generating a new CAT with respect to the reliability requirement and associating the new CAT with the changed assertion-related instructions, the code verification ERR will not be verifiable. In some embodiments, the reliability ensurer 106 can be configured to verify a code verification ERR at another time, such as when an image of the instructions for the device 107 are built.

The reliability ensurer 106 can further be configured to generate an image verification ERR, which is associated with an image of instructions for the target device 107. In some embodiments, an image of the instructions for the target device 107 can be built by the developer device 102. The reliability ensurer 106 can be configured to receive image data comprising data associated with a built image from the developer device 102. In some embodiments, the reliability ensurer 106 can be configured to generate the image verification ERR based at least in part on received image data and any code verification ERRs associated with instructions for the target device 107. In some embodiments, the reliability ensurer 106 can be configured to generate multiple image verification ERRs, each associated with a different state that an image built of instructions for the device may take.

Figure 1F:
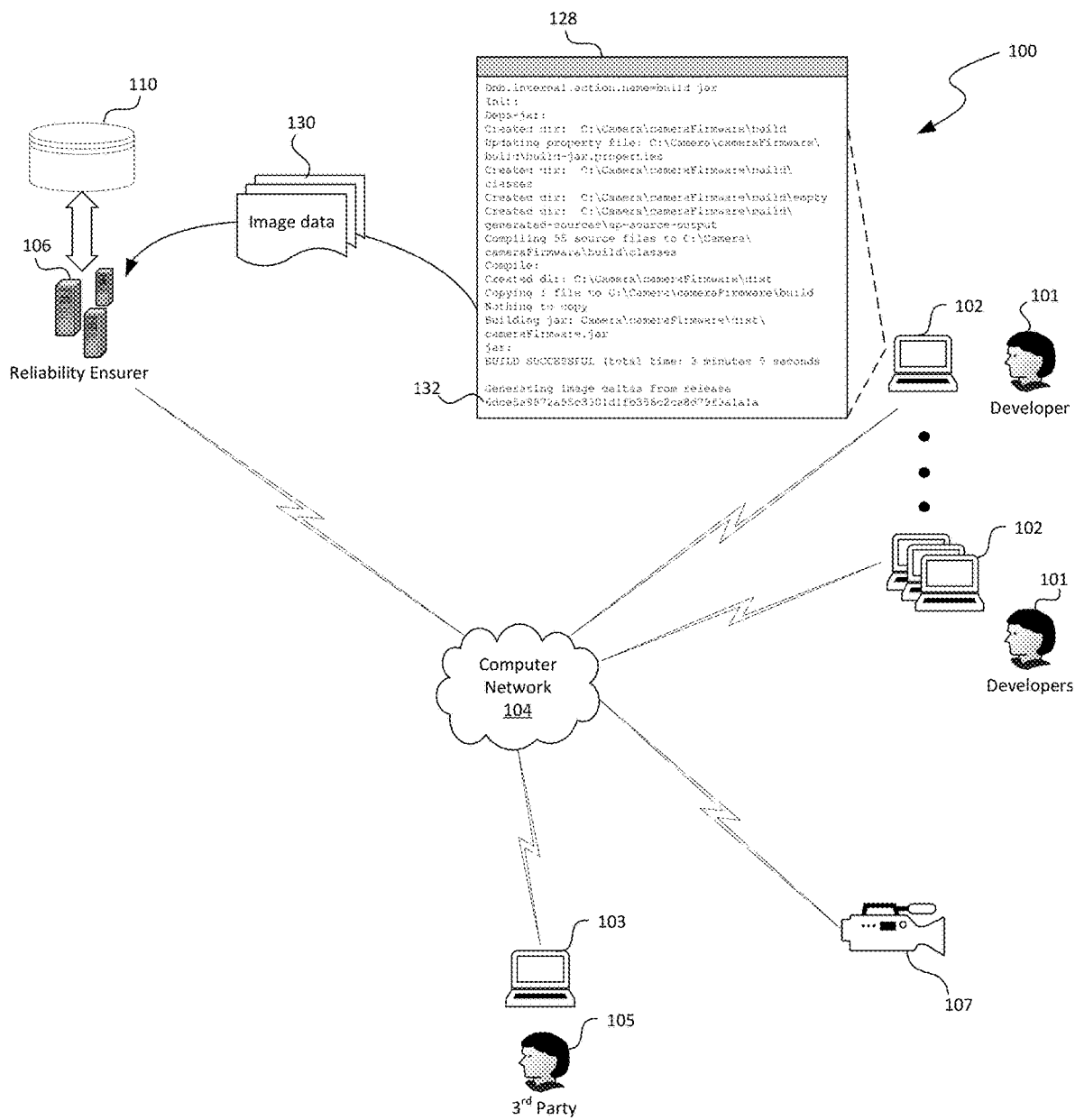

For example, as shown in FIG. 1F, the developer device 102 can be configured to execute one or more applications 128 configured to facilitate building an image of the instructions for the target device 107. In some embodiments, the applications 128 can be configured to automatically provide the reliability ensurer 106 with image data 130 comprising data associated with the built image in response to the image being built.

In some embodiments, image data 130 can comprise a unique identifier associated with the image. In some embodiments, the image data 130 can comprise a hash of the image. For example, in some embodiments, the application 128 can be configured to generate a hash of the image using an encryption program such as Pretty Good Privacy ("PGP). In the illustrated example shown in FIG. 1E, the application 128 has output a hash, "6dce5a9872a55c3301d1fb356c2ca8d79f3a1a1a," that was generated in the build process. In some embodiments, the hash of the image comprises a digital signature for the image.

In some embodiments, the image data 130 that is transferred to the reliability ensurer 106 can comprise build metadata. For example, build metadata can comprise a build origin (e.g., CircleCI), a build hash, a build version, a time of a build, and an origin of code from a build (e.g., GitHub). In some embodiments, build metadata can comprise a test log associated with an image of instructions. In some embodiments, the build metadata can act as assertions of the image build process.

In some embodiments, the reliability ensurer 106 can be configured to generate an image verification ERR based at least in part on applying an encryption function to a string concatenation of code verification ERRs associated with the instructions for the target device 107 and the received image data 130. The reliability ensurer 106 can be configured to store the image verification ERR in the database 110 in association with the code verification ERRs.

Figure 1G:
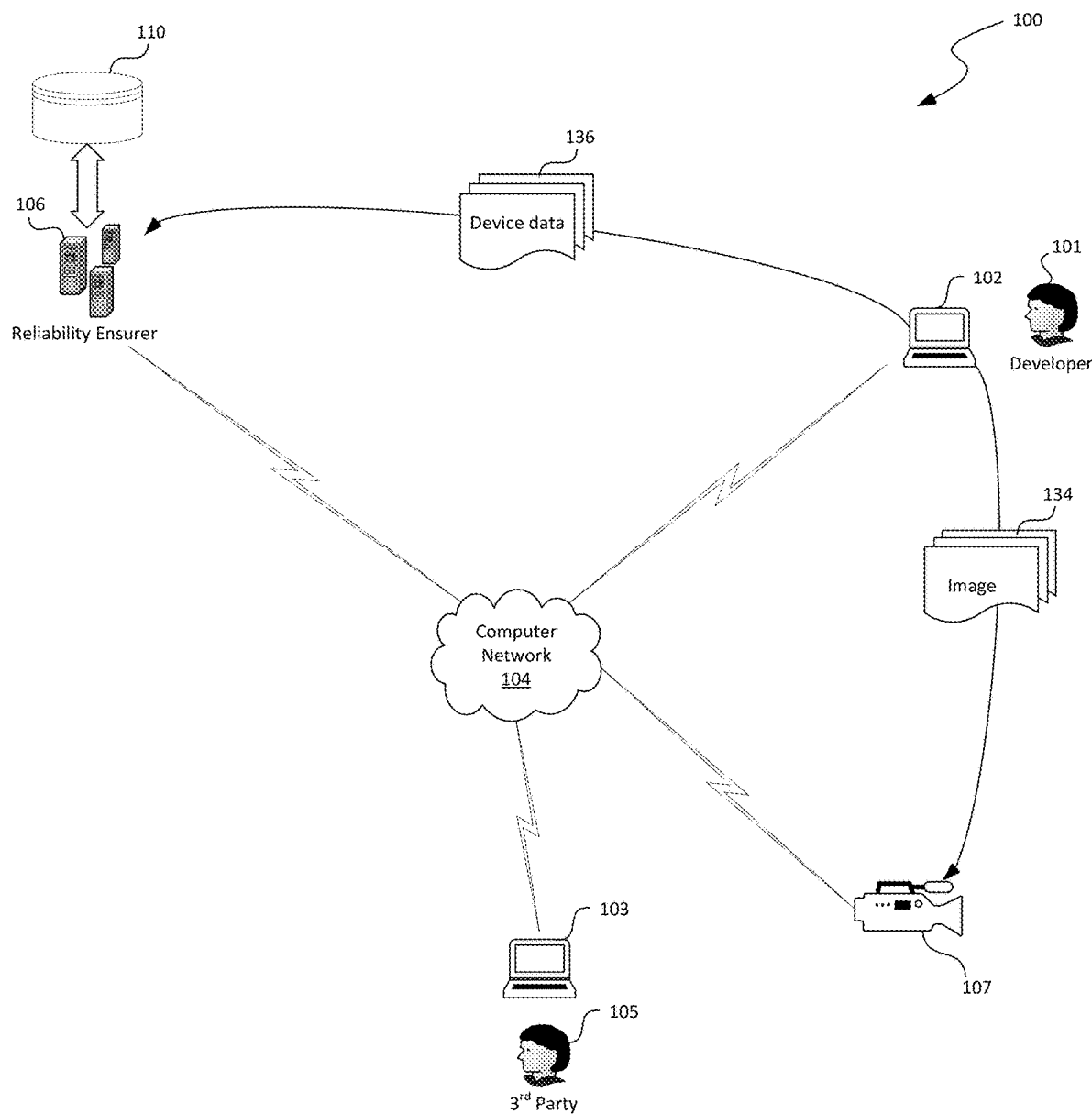

The reliability ensurer 106 can further be configured to generate a device verification ERR, which can be associated with the image of instructions for the target device 107 being installed on the target device 107. As shown in FIG. 1G, in some embodiments, the developer device 102 can be configured to push an image 134 of the instructions for the target device 107 to the target device 107 for installation. For example, in some embodiments, the image 134 can be configured to install the instructions for the device comprising firmware on the target device 107. In some embodiments, the developer device 102 can be configured to execute one or more applications for device management which can be configured to push the image to the target device 107.

The reliability ensurer 106 can be configured to receive device data 136 from the user device. For example, in response to pushing the image 134 to the target device 107, the developer device 102 can be configured to transfer device data 136 to the reliability ensurer 106. In some embodiments, device data 136 can comprise an indication that the target device 107 was pushed the image 134 of the instructions. In some embodiments, the device data 136 can comprise an identifier for the target device 107, such as a MAC address of the target device 107. In some embodiments, device data 136 can comprise other metadata associated with the device 107 and/or the installation of the image 134 on the device, such as an IP Address, a geographic location of the target device 107, a device management system that pushed the image to the target device 107, and a time and date that the image was pushed. In some embodiments, the device data can comprise an identifier for the image 134 pushed to the target device 107. For example, an identifier for the image can comprise the hash 132 (FIG. 1F) of the image.

The reliability ensurer 106 can then be configured to generate a device verification ERR. In some embodiments, the reliability ensurer 106 can be configured to generate the device verification ERR based at least in part on the image verification ERR and a unique identifier for the device, such as a MAC address of the target device 107. In some embodiments, the reliability ensurer 106 can be configured to generate the device verification ERR based at least in part on the image verification ERR, an identifier of the target device 107, and metadata associated with the target device 107 and/or the installation of the image 134. In such an embodiment, the metadata can act as an assertion that the image was installed on the device, when the image was installed, and/or that the image was installed on the device at a specified geographic location.

Figure 1H:
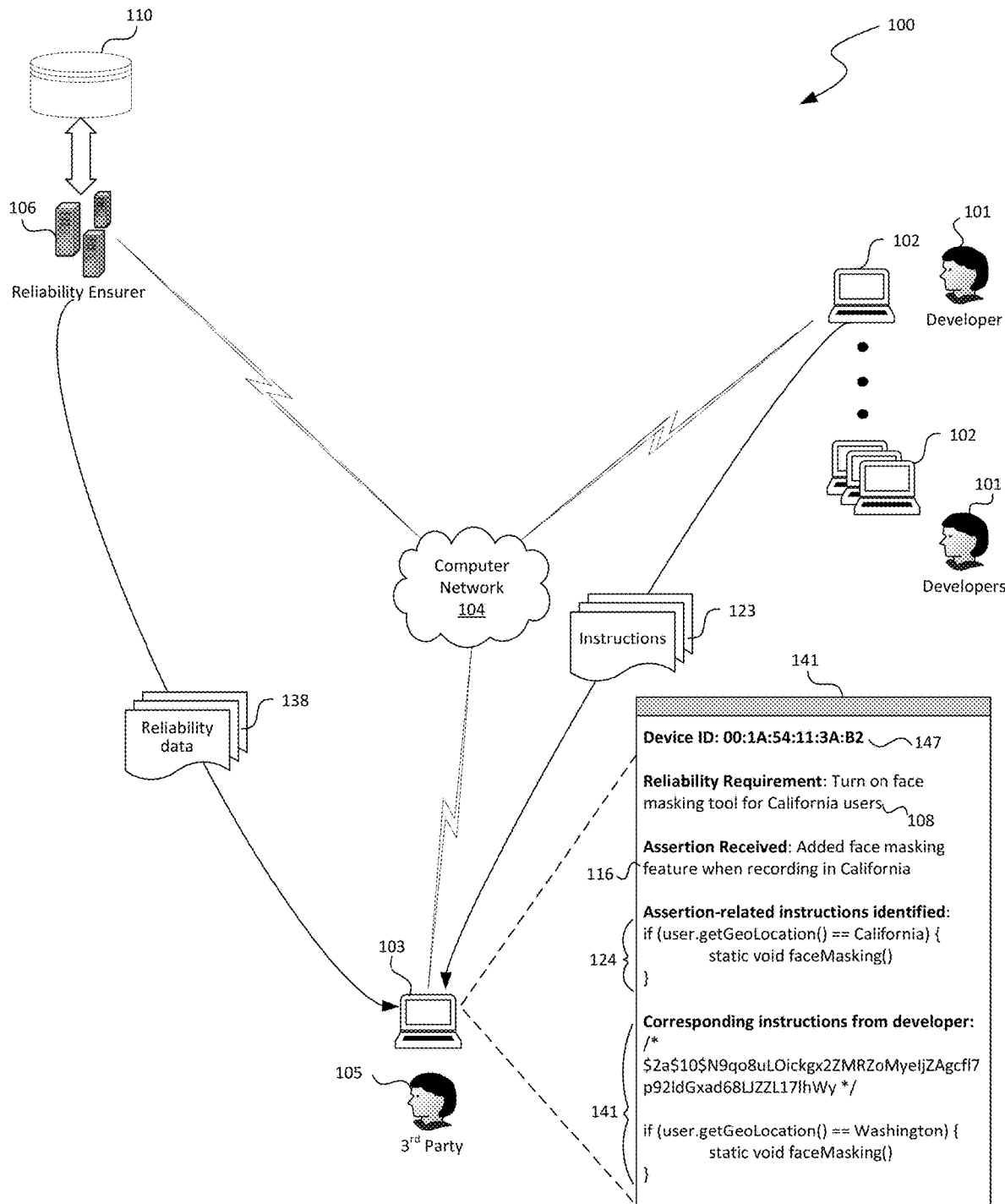

As shown in FIG. 1H, the reliability ensurer 106 can be configured to provide reliability data 138 to the third party 105 at the third party device 103, for example, for auditing the instructions of the target device 107. In some embodiments, the reliability data 138 can comprise reliability requirements, assertions, CATs, code verification ERRs, image verification ERRs, and the device verification ERR. In some embodiments, reliability data can also comprise data used for generating the code verification ERRs, the image verification ERR, and/or the device verification ERR, such as a key for decrypting the ERRs. The third party 105 can also receive, at the third party device 103, instructions 123 for the target device 107 from the developer device 102. The instructions 123 can also comprise data related to the instructions, such as metadata including checksums.

The third party 105 can compare reliability data 138 received from the reliability ensurer 106 with instructions 123 received from the user device in order to audit the instructions 123 relative to reliability requirements. In some embodiments, as shown in FIG. 1H, the third party device 103 can be configured to execute one or more applications 141 configured to facilitate auditing the instructions 123. For example, the third party 105 may audit the instructions 123 in response to a failure of instructions for the device 107 to perform consistently with a reliability requirement.

One benefit of the disclosed technology is that an auditor can request reliability data 138 associated with a specific device, which can be identified by a device identifier 147 used for generating a device verification ERR. In some embodiments, the reliability ensurer 106 can provide and verify the device verification ERR associated with the device identifier 147, image verification ERRs used for generating the device verification ERR, and code verification ERRs used for generating the image verification ERRs, and provide reliability data 138 associated with the respective ERRs, including, for example, associated reliability requirements and received assertions. In some embodiments, the reliability ensurer 106 can provide an encryption key associated with an ERR for decrypting and/or verifying the ERR.

In the illustrated example, the device being reviewed has a device identifier 147 comprising a MAC address. The third party 105 may wish to review the reliability data 138 because the device may have recorded people's faces while operating in California. Based on a comparison of the assertion-related instructions 124 associated with the reliability requirement 108 and the instructions received from the developer 101, the third party 105 can determine that the assertion-related instructions were modified by a developer without the developer verifying and reasserting that the reliability requirement 108 had been addressed. Additionally, a developer may have ignored warnings by the reliability ensurer 106, such as when the image of the instructions was built, that the reliability requirement 108 was not addressed. In doing so, a mistake was introduced in the instructions, as the faceMasking function was not activated in California.

FIG. 1H shows an example where instructions were pushed to a device after a mistake was introduced because the instructions were not properly audited during development. As discussed herein, the reliability ensurer 106 can be configured to help prevent such a situation from happening. For example, in some embodiments, as described herein with reference to FIG. 1E and FIGS. 3-8, the reliability ensurer 106 can be configured to generate a report or an alert for the developer 101 when a reliability requirement is not addressed. In some embodiments, the report can comprise a user interface including a list of reliability requirements associated with instructions for the device 107 that have not been addressed.

Figure 2A:
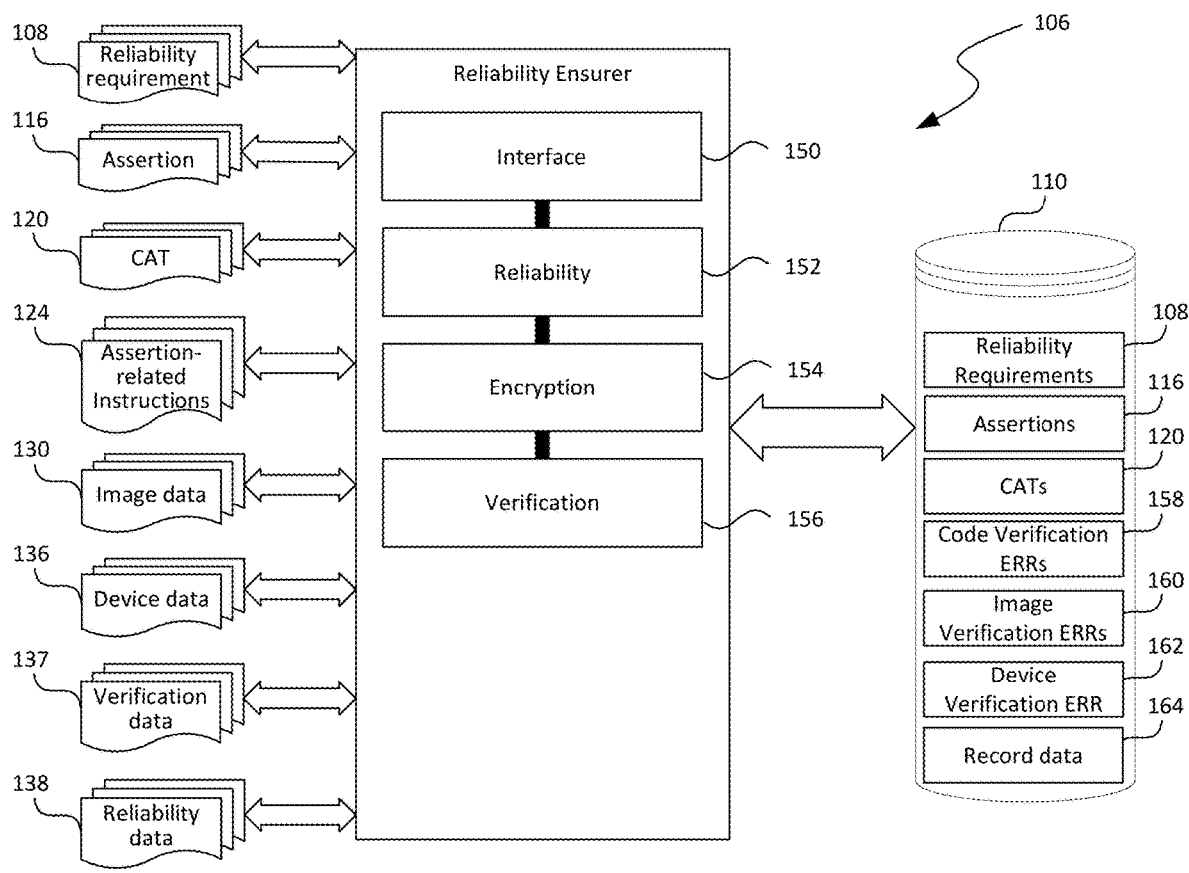
FIGS. 2A-B are schematic diagrams illustrating certain hardware/software components of the reliability ensurer and a reliability agent of FIGS. 1A-1H in accordance with embodiments of the disclosed technology.
Figure 2B:
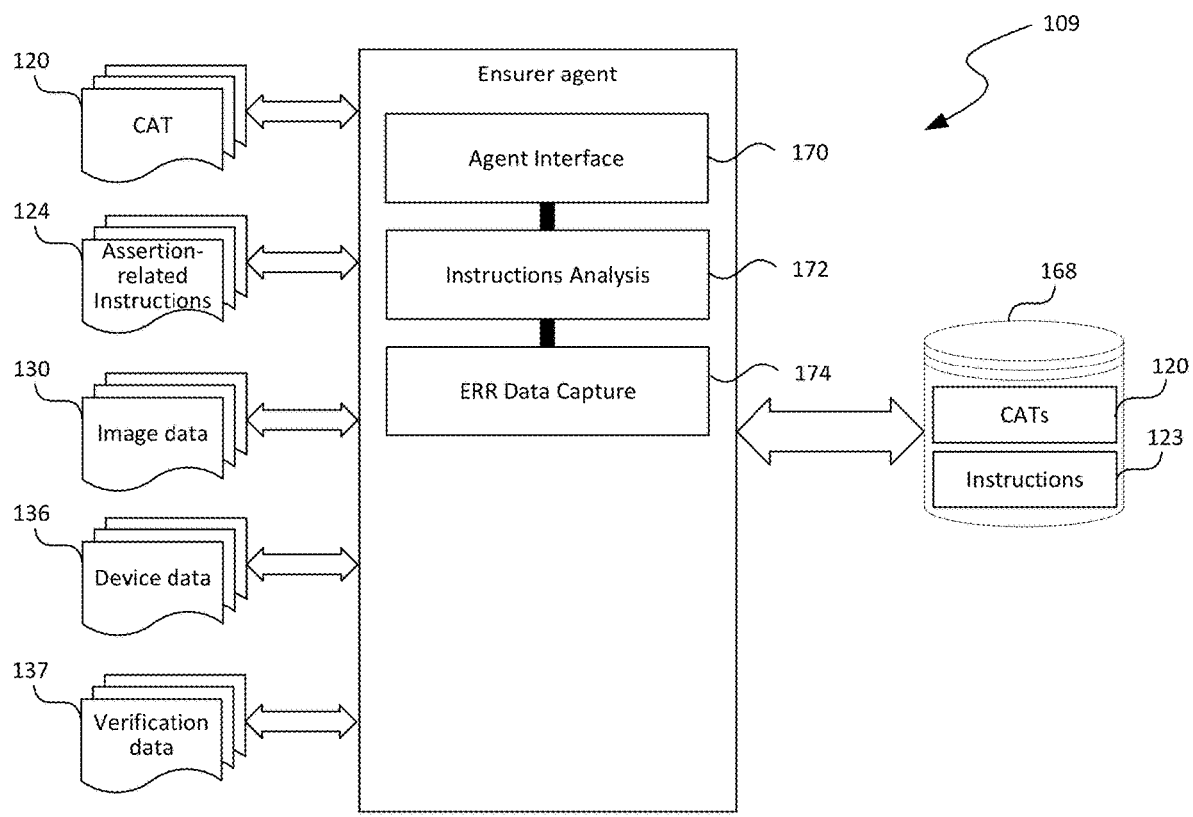

FIG. 2A is a schematic diagram illustrating certain hardware/software components of the reliability ensurer 106 of FIGS. 1A-1H in accordance with embodiments of the disclosed technology. FIG. 2B is a schematic diagram illustrating certain hardware/software components of an ensurer agent 109 running, at least in part, on the developer device 102 of FIGS. 1A-1H in accordance with embodiments of the disclosed technology. In FIGS. 2A-B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software.

Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

The reliability ensurer 106 can include one or more processors coupled to a memory containing instructions executable by the one or more processors to cause the processors to provide certain functional components. For example, as shown in FIG. 2, the reliability ensurer 106 can include an interface component 150, a reliability component 152, an encryption component 154, and a verification component 156 interconnected with the database 110. In one embodiment, all of the foregoing software components can reside on a single computing device (e.g., a server comprising the reliability ensurer 106, as shown in FIGS. 1A-1H). In other embodiments, the software components can also reside on a plurality of distinct computing devices such as servers in a datacenter. In further embodiments, the software components may also include network components and/or other suitable modules or components (not shown). In yet further embodiments, at least one of the foregoing components can reside on another server separate from the reliability ensurer 106. In yet further embodiments, at least one of the foregoing components can reside, at least in part, on the developer device 102.

As shown in FIG. 2A, the interface component 150 can be configured to receive the assertion 116 from the application 112 (FIG. 1A). The interface component 150 can be configured to store the received assertion 116 in the database 110 in association with the reliability requirement 108 that the assertion 116 was received in relation to. The interface component 150 can be configured to provide the received assertion 116 to the encryption component 154, which is configured to generate the CAT 120 based on the received assertion 116. The interface component 150 can be configured to provide the generated CAT 120 to the developer 101 via the application 112 (FIG. 1A). The interface component 150 can also be configured to provide the ensurer agent 109 with the CAT 120 and/or the assertion 116. The CAT 120 is also stored in the database 110 in association with the assertion 116 and the reliability requirement 108.

The interface component 150 can be configured to receive the assertion-related instructions 124, image data 130, and device data 136 from the developer device 102. In some embodiments, the ensurer agent 109 can run, at least in part, on the developer device 102 and/or other devices and services used by the developer device 102, and the interface component 150 can be configured to receive the assertion-related instructions 124, image data 130, and/or device data 136 from the ensurer agent 109. The assertion-related instructions 124 can be provided to the encryption component 154 for generating a code verification ERR associated with the reliability requirement 108. The image data 130 can be provided to the encryption component 154 for generating an image verification ERR. The device data 136 can be provided to the encryption component 154 for generating a device verification ERR. In some embodiments, the assertion-related instructions 124, image data 130, and/or device data 136, or a portion thereof, can be stored in the database 110 and can comprise record data 164. In some embodiments, the interface component 150 can receive verification data 137 from the ensurer agent 109. In some embodiments, verification data 137 can comprise a current copy of assertion-related instructions, which the assertion component 150 can provide to the verification component 156 for verifying a code verification ERR.

In some embodiments, the interface component 150 can be configured to interface with third party services, devices, and/or systems (not shown) to facilitate receiving assertion-related instructions 124, image data 130, device data 136, and/or verification data 137. For example, in some embodiments, the interface component 150 can be configured to receive assertion-related instructions 124 from the developer device 102 via a third party software system, such as a development and version control system (e.g., GitHub), a build or testing system (Jenkins), and/or a deployment system (Balena, AWS IoT). The interface component 150 can be configured to interface with multiple different user devices 102.

The database can store multiple reliability requirements 108 associated with instructions for the target device 107. The reliability component 152 can be configured to provide the interface component 150 with the reliability requirement 108 and the interface component 150 can present the reliability requirement 108 to the developer 101 via the application 112 and webpage 114 (FIG. 1A).

In certain embodiments, the interface component 150 can include a network interface module with suitable firmware or software to perform the foregoing and following operations. In other embodiments, the interface component 150 can include other suitable types of communications modules.

The reliability component 152 is configured to select the reliability requirement 108 to display to the developer 101 among other reliability requirements 108 stored in the database 110 that are associated with the instructions for the target device. In some embodiments, the reliability component 152 can identify multiple reliability requirements to provide to the interface component 150 for presentation to the developer 101. For example, in some embodiments, the reliability component 152 can be configured to identify all reliability requirements associated with instructions for the device 107, for which no code verification ERR has been generated. In some embodiments, the reliability component 152 can be configured to receive, via the interface component 150, an indication that the assertion-related instructions 124 have changed, and the reliability component 152 can be configured to provide the reliability requirement 108 to the interface component 150 for presentation to the developer 101 for re-verifying that the reliability requirement 108 is addressed.

The reliability requirement 108 can be created for and/or associated with the target device by an administrator of the reliability ensurer 106. In some embodiments, the reliability requirement 108 can be created for and/or associated with the target device by the developer 101 or a party (not shown) associated with the developer 101 (e.g., a software development partner) or another developer. In some embodiments, the reliability requirement 108 can be created for and/or associated with instructions for the target device by the third party 103. For example, in some embodiments, the third party 103 can comprise an auditor of the instructions for the target device, and the auditor can create the reliability requirement for the instructions of the target device based, for example, on a regulation that applies to the target device in a jurisdiction that the target device is going to be sold or used in.

In some embodiments, the reliability component 152 can be configured to provide, via the interface component 150, a wizard that elicits responses from a user (e.g., the developer 101 or third party 103), which the reliability component 152 can be configured to use for identifying reliability requirements to be associated with the target device. For example, in some embodiments, a wizard can include questions for the user about the target device, such as questions about a geographic region that the target device will be sold or used, and, based at least in part on the responses received from the user, the reliability component 152 can create, using reliability requirement templates, the reliability requirements 108 that are then associated with instructions for the target device.

The encryption component 154 is configured to generate the CAT 120. In some embodiments, the CAT 120 comprises a unique identifier. In some embodiments, the CAT 120 can comprise a hash of a string value comprising the assertion 116. For example, in some embodiments, the encryption component 154 can be configured to generate the CAT 120 in response to receiving the assertion 116 by generating a hash of the received assertion 116. In some embodiments, the encryption component 154 can be configured to generate a unique hash related to a product and/or company so that it can be differentiated from CATs generated for instructions of other devices in the system.

The encryption component 154 is configured to store the generated CAT 120 in association with the assertion 116 and the reliability requirement 108 in the database 110. The encryption component 154 is also configured to provide the CAT 120 to the interface component 150.

The encryption component 154 is also configured to generate ERRs. The encryption component 154 is configured to receive assertion-related instructions 124, image data 130, and device data 136 via the interface component 150. The encryption component 154 is configured to generate code verification ERRs 158, image verification ERRs 160, and device verification ERRs 162 that it stores in the database 110. In some embodiments, the encryption component 154 is also configured to store record data 164 comprising data used for generating an ERR, in association with the ERR, in the database 110. In some embodiments, the record data 164 can comprise, for example, device data 136, image data 130, and/or assertion-related instructions 124, and/or metadata included therewith. For example, in some embodiments, record data 164 can comprise test files but not source code of instructions for the device. In some embodiments, the encryption component 154 is also configured to store any cryptographic keys used for generating or verifying an ERR in association with the ERR in record data 164 in the database 110 for verification of the ERR.

The encryption component 154 can be configured to generate the code verification ERR 158 based at least in part on the CAT 120 and the assertion-related instructions 124. For example, in some embodiments, the encryption component 154 can comprise a code verification ERR generator, and the encryption component 154 can be configured to generate the code verification ERR 158 by inputting into the code verification ERR generator a string concatenation of the CAT 120 and the assertion-related instructions 124. In some embodiments, the code verification ERR generator comprises an encryption program, such as Pretty Good Privacy ("PGP"). In some embodiments, the code verification ERR generator comprises bcrypt. The code verification ERR 158 can be stored in the database 110 in association with the assertion 116, CAT 120, and the reliability requirement 108. In some embodiments, the code verification ERR can also be stored in association with record data 164 comprising at least some of the assertion-related instructions 124 used for generating the code verification ERR.

In some embodiments, the assertion-related instructions 124 that are used for generating the code verification ERR 158 comprise a text string comprising source code of the instructions for the target device. In some embodiments, the assertion-related instructions 124 are encrypted. In some embodiments, the assertion-related instructions comprise a hash of source code of the assertion-related instructions. In some embodiments, the assertion-related instructions comprise a hash of a file that contains the assertion-related instructions.

In some embodiments, the assertion-related instructions 124 that are used for generating the code verification ERR 158 can comprise metadata associated with the assertion-related instructions 124. For example, in some embodiments, the encryption component 154 can be configured to generate the code verification ERR 158 based at least in part on input comprising a concatenation of the CAT 120, the received assertion-related instructions 124, and metadata comprising at least one of: a location in a file system or repository of the assertion-related instructions 124, a location in a file of the assertion-related instructions 124, a file size or type of the file that includes the assertion-related instructions 124, a managing system of a version control system (e.g, Git Repo on GitHub), a file name that includes the assertion-related instructions 124, a commit hash associated with the assertion-related instructions 124, and an identifier for the developer 101 (e.g., a username).

The encryption component 154 is also configured to generate the image verification ERR 160. In some embodiments, the encryption component 154 can be configured to generate the image verification ERR 160 based at least in part on the code verification ERR 158 and image data 130. When multiple code verification ERRs are associated with instructions for the target device 107, the encryption component 154 can be configured to generate the image verification ERR 160 based at least in part on each of the multiple code verification ERRs. In some embodiments, an image of instructions can take any of multiple different states, for example, based on a feature flag, and multiple image verification ERRs can be generated, including at least one for each state, and each based on code verification ERRs for a respective state.

In some embodiments, the image data 130 can comprise a unique identifier associated with the image. In some embodiments, the image data 130 can comprise a hash of the image. In some embodiments, the image data 130 can comprise a digital signature associated with the image. In some embodiments, image data 130 can comprise build metadata. For example, build metadata can comprise a build origin (e.g., CircleCl), a build hash, a build version, a time of a build, and an origin of code from a build (e.g., GitHub). Build metadata can act as assertions of the image build process. In some embodiments, build metadata can comprise output of a build process for generating the image, such as a test file.

In some embodiments, the encryption component 154 can be configured to generate the image verification ERR 160 based at least in part on a string concatenation of code verification ERRs 158 associated with the instructions for the target device 107 and image data 130. The encryption component 106 can comprise an image verification ERR generator (not shown) that can be configured to generate the image verification ERR based at least in part on input of the code verification ERRs 158 and the image data 130. In some embodiments, the image verification ERR generator comprises an encryption program, such as Pretty Good Privacy ("PGP"). In some embodiments, the image verification ERR generator comprises bcrypt. In some embodiments, the encryption component 154 can be configured to store the resulting image verification ERR 160 in the database 110 in association with record data 164 comprising the code verification ERRs and at least some of the image data 130.

The encryption component 154 is configured to generate the device verification ERR 162. In some embodiments, the encryption component 154 can be configured to generate the device verification ERR 162 based at least in part on the image verification ERR 160 for the image installed on the device and device data 136. In some embodiments, the device data 136 used for generating the device verification ERR 162 comprises an identifier for the device. For example, in some embodiments, the encryption component 154 can be configured to generate the device verification ERR 162 by inputting into a device verification ERR generator a string concatenation of the image verification ERR 162 and device data 136 comprising an identifier for the target device. For example, in some embodiments, the device verification ERR can be generated based at least in part on the image verification ERR and a MAC address of the target device. In some embodiments, the device verification ERR generator comprises an encryption program or function, such as Pretty Good Privacy ("PGP"). In some embodiments, the device verification ERR generator comprises bcrypt.

In some embodiments, the encryption component 154 can be configured to generate the device verification ERR 162 based at least in part on the image verification ERR 160, an identifier associated with the target device 107, and metadata associated with the target device 107 and/or the installation of the image 134 on the target device 107. In such an embodiment, the metadata can act as an assertion that the image was installed on the device, when the image was installed, and/or that the image was installed on the device at a specified geographic location.

The verification component 156 is configured to generate reliability data 138 that it can provide, via the interface component 150, to the developer device 102 and/or the third party device 103. In some embodiments, the reliability data 138 can comprise data associated with a determined reliability of instructions for the device. For example, in some embodiments, reliability data 138 can comprise an alert including that instructions for the device are not reliable. In some embodiments, instructions for the device can be determined to be not reliable when a reliability requirement associated with the instructions is not addressed. In some embodiments, the reliability data 138 can comprise reliability auditing data. For example, in some embodiments, reliability auditing data can comprise an ERR and record data 164 used for generating the ERR. Reliability data 138 can also comprise reliability requirements, assertions, CATs associated with the assertions, and metadata associated with an ERR, such as a time and date that the ERR was generated. In some embodiments, reliability data 138 can comprise a cryptographic key stored in record data 164 that can be used to verify or decrypt an ERR.

In some embodiments, the verification component 156 can be configured to generate reliability data 138 comprising a determined reliability for instructions for the device. In some embodiments, a determined reliability for instructions for the device 107 comprises a binary (e.g., the instructions are reliable or not reliable). For example, in some embodiments, the verification component 156 can be configured to determine that instructions for the target device are reliable when no reliability requirements are currently unaddressed. In some embodiments, a reliability requirement is not currently addressed when a code verification ERR associated with the reliability requirement cannot be verified or no code verification ERR has been generated for the reliability requirement.

In some embodiments, the verification component 156 can be configured to attempt to verify a code verification ERR to determine whether a reliability requirement associated with the code verification ERR is currently addressed. For example, in some embodiments, the verification component 156 can be configured to determine that the reliability requirement 108 is not met when no code verification ERR has been generated with respect to the reliability requirement 108. In some embodiments, the verification component 156 can be configured to determine that the reliability requirement 108 is not addressed when assertion-related instructions 124 used for generating a code verification ERR associated with the reliability requirement 108 have changed. For example, after generating the code verification ERR 158 associated with the assertion-related instructions 124, the verification component 156 can be configured to receive verification data 137 comprising a current state of the assertion-related instructions. The verification component 156 can be configured to verify whether the reliability requirement 108 is addressed by generating a new code verification ERR using, at least in part, the current state of the assertion-related instructions and the CAT 120 used for generating the stored code verification ERR 158. When the new code verification ERR does not match the stored code verification ERR 158, the verification component 156 can be configured to determine that the reliability requirement 108 is not addressed.

The ensurer agent 109 can include one or more processors coupled to a memory containing instructions executable by the one or more processors to cause the processors to provide certain functional components. For example, as shown in FIG. 2B, the ensurer agent 109 can include an agent interface component 170, an instructions analysis component 172, and an ERR data capture component 174 interconnected with a database 168. In one embodiment, all of the foregoing software components can reside on a single computing device (e.g., the developer device 102). In other embodiments, the software components can also reside on a plurality of distinct computing devices such as multiple developer devices 102 and/or a single developer device 102 and the reliability ensurer 106. In further embodiments, the software components may also include network components and/or other suitable modules or components (not shown). In yet further embodiments, at least one of the foregoing components can reside on another server or system separate from the developer device 102, such as on computing devices of a development and version control system (e.g., GitHub).

The agent interface component 170 can be configured to receive the CAT 116 from the reliability ensurer 106 and provide the reliability ensurer 106 with assertion-related instructions 124, image data 130, device data 136, and verification data 137. In some embodiments, the agent interface component 170 can also be configured to receive a string value comprising an assertion received by the reliability ensurer 106 from the developer 101. The agent interface component 170 can also be configured to receive input from the developer 101 via the applications 122, 128 (FIGS. 1D & 1F). For example, in some embodiments, the agent interface component 170 can provide the ERR data capture component 174 with input from the developer comprising a selection by the developer of a portion of instructions that address a reliability requirement and input from the developer comprising a request to associate the selected instructions with the CAT 116.

The agent interface component 170 can also be configured to interface with third party services, devices, and/or systems (not shown) to facilitate providing assertion-related instructions 124, image data 130, device data 136, and/or verification data 137 to the reliability ensurer 106, and to obtain and store target device instructions 123 in the database 168, which can be provided to the instructions analysis component 172. For example, in some embodiments, the agent interface component 170 can be configured to receive target device instructions 123 from a third party software system, such as a development and version control system (e.g., GitHub).

In certain embodiments, the agent interface component 170 can include a network interface module with suitable firmware or software to perform the foregoing operations. In other embodiments, the agent interface component 170 can include other suitable types of communications modules.

The instructions analysis component 172 is configured to search for and identify assertion-related instructions that address a reliability requirement in the target device instructions 123. For example, the instructions analysis component 172 can automatically identify assertion-related instructions based at least in part on a comparison of target device instructions 123 and example instructions identified by the developer or based on instructions identified by a pattern matching tool. For instance, the instructions analysis component 172 can track all states that an image of the target device instructions 123 could take as a result of feature flags in the target device instructions 123 and automatically identify assertion-related instructions for all of the states of the target device instructions 123 based on a developer's selection of an example of assertion-related instructions for one state of the instructions.

In some embodiments, rules for identifying assertion-related instructions associated with a reliability requirement can be received from a third party that does not have access to the target device instructions 123, enabling the third party to help identify assertion-related instructions for a reliability requirement. In some embodiments, the instructions analysis component 172 can comprise an encryption component (not shown) that can be configured to encrypt the assertion-related instructions, and the instructions analysis component 172 can be configured to search encrypted target device instructions 123 for other assertion-related instructions that match the assertion-related instructions 124.

The instructions analysis component 172 is also configured to monitor target device instructions 123 for changes in the assertion-related instructions 124. In some embodiments, the instructions analysis component 172 can be configured to capture a current state of assertion-related instructions and provide verification data 137 comprising the current state of assertion-related instructions to the reliability ensurer 106. In some embodiments, the instructions analysis component 172 can be configured to capture a current state of instructions for verifying an ERR when a change has been detected in a file of the assertion-related instructions 124. In some embodiments, the instructions analysis component 172 can be configured to capture a current state of instructions for verifying an ERR when a change has been detected in the assertion-related instructions 124 themselves. In some embodiments, the instructions analysis component 172 can be configured to capture a current state of instructions, including any needed metadata, for verifying an ERR when the developer 101 has requested to build an image of the target device instructions 123.

The ERR data capture component 174 can be configured to capture assertion-related instructions 124, image data 130, and device data 136, which it can provide, via the agent interface component 170, to the reliability ensurer 106. In some embodiments, the ERR data capture component 174 can be configured to capture assertion-related instructions 124, image data 130, and/or device data 136 by interfacing, via the agent interface component 170, with third party software system, such as a development and version control system (e.g., GitHub), a build or testing system (Jenkins), and/or a deployment system (Balena, AWS IoT). The ERR data capture component 174 can also be configured to capture metadata associated with captured assertion-related instructions 124, image data 130, and device data 136, that it can be configured to include in assertion-related instructions 124, image data 130, and device data 136, respectively.

In some embodiments, the ERR data capture component 174 can receive the CAT 120 via the agent interface component 170. In some embodiments, the ERR data capture component 174 can be configured to receive a selection, via the agent interface component 170, by a developer of assertion-related instructions 124 from among the target device instructions 123, and store the CAT 120 in association with the assertion-related instructions 124 in the database 168.

In some embodiments, the ERR data capture component 174 can be configured to comprise an encryption component configured to encrypt captured data. For example, in some embodiments, the ERR data capture component 174 can be configured to encrypt assertion-related instructions 124 and verification data 137 comprising current assertion-related instructions prior to providing this data to the reliability ensurer 106.

Figure 3:
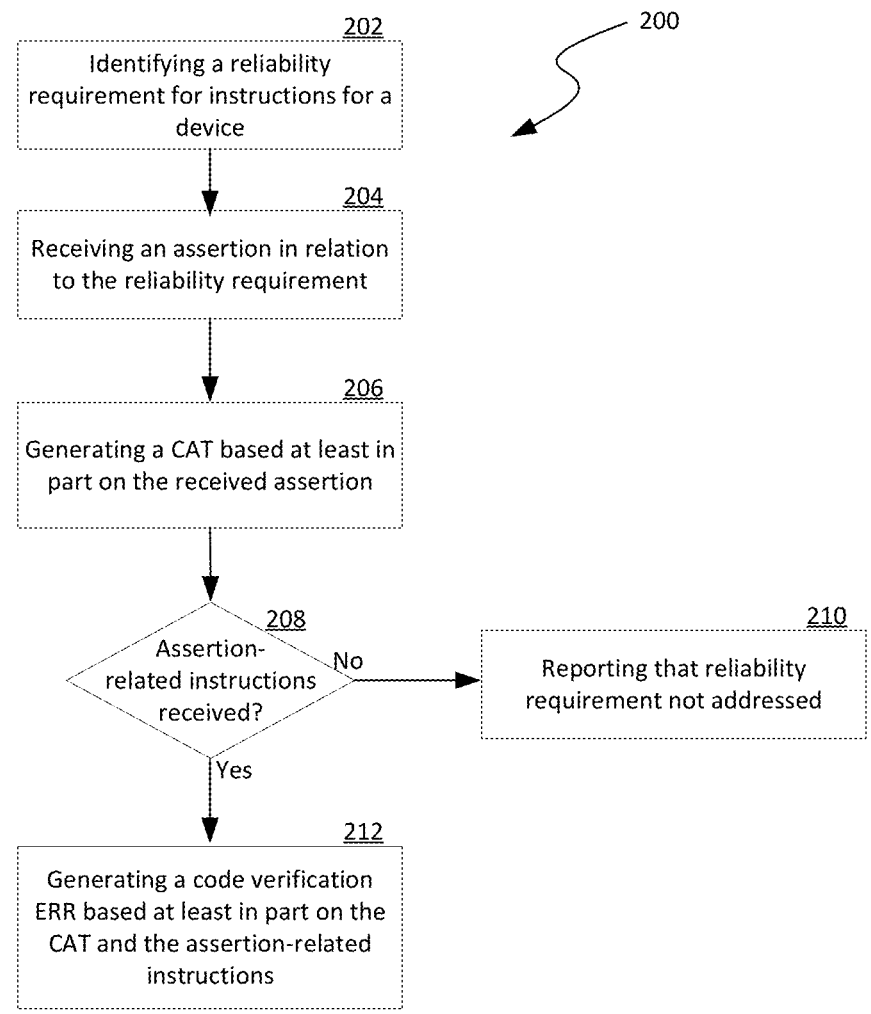
FIG. 3 is a flowchart illustrating various processes of generating a code verification ERR in accordance with embodiments of the disclosed technology.

FIG. 3 is a flowchart illustrating a process 200 of generating a code verification ERR in accordance with embodiments of the disclosed technology. Even though various embodiments of the process 200 are described below with reference to the computing system 100 of FIGS. 1A-1H and the software components of FIGS. 2A-2B, in other embodiments, the process 200 can also be performed with other suitable types of computing frameworks, systems, components, or modules.

The reliability ensurer 106 can be configured to identify a reliability requirement for instructions for a target device, such as the target device 107, at stage 202. In some embodiments, the reliability ensurer 106 can be configured to identify the reliability requirement from among multiple reliability requirements associated with instructions for the target device based at least in part on a selection by a user, such as the developer 101, of the reliability requirement. For example, in some embodiments, the reliability ensurer 106 can be configured to generate an interface showing reliability requirements associated with instructions for the target device, and receive, via the interface, a selection by the developer of the reliability requirement via the developer device.

The process 200 can then include receiving an assertion in relation to the reliability requirement at stage 204. For example, the reliability ensurer 106 can be configured to generate an interface configured to receive, in relation to the reliability requirement, a string value comprising the assertion.

The process 200 can then include generating a CAT based at least in part on the received assertion at stage 206. In some embodiments, the reliability ensurer 106 can be configured to generate the CAT based at least in part on computing a hash of at least part of the received assertion. In some embodiments, the reliability ensurer 106 can be configured to generate an interface showing the CAT, which can be viewed and copied by the developer. In other embodiments, the reliability ensurer 106 can be configured to automatically transfer the CAT to the developer device for including in the instructions for the target device.

The process 200 can then include a decision stage 208 to determine whether assertion-related instructions have been received with respect to the assertion. In response to determining that no assertion-related instructions have been received, the process 200 proceeds to reporting that the reliability requirement has not been addressed at stage 210. In some embodiments, the reliability ensurer 106 can determine that the reliability requirement has not been addressed until it receives assertion-related instructions in association with the generated CAT. In some embodiments, reporting that the reliability requirement is not addressed can comprise storing a flag in association with the reliability requirement indicative of the reliability requirement having not been met. In some embodiments, storing a flag in association with the reliability requirement indicative of the reliability requirement having not been met comprises generating an alert for the developer via a user interface.

In response to receiving assertion-related instructions, the process 200 proceeds to generating a code verification ERR at stage 212. In some embodiments, the reliability ensurer 106 can receive the assertion-related instructions based at least in part on receiving assertion-related instructions identified by the developer as addressing the received assertion. For example, in some embodiments, the reliability ensurer 106 can be configured to receive assertion-related instructions based at least in part on receiving a selection, by the developer, of a portion of instructions for the device, and an instruction to associate the CAT with the selection. In some embodiments, the reliability ensurer 106 can be configured to receive assertion-related instructions based at least in part on identifying a tag in instructions associated with the assertion. For example, in some embodiments, the reliability ensurer 106 can be configured to receive assertion-related instructions based at least in part on receiving a file that includes instructions for the device and identifying a component comprising the CAT in a location in instructions relative to the assertion-related instructions. In some embodiments, the reliability ensurer 106 can receive the assertion-related instructions based at least in part on receiving, from the developer, the assertion-related instructions via a text input field in an interface generated by the reliability ensurer 106.

In some embodiments, the reliability ensurer 106 can be configured to receive assertion related instructions based at least in part on automatically identifying assertion-related instructions in instructions for the device. For example, in some embodiments, the reliability ensurer 106 can be configured to automatically scan instructions for the device for assertion-related instructions. For example, in some embodiments, the reliability ensurer 106 can identify assertion-related instructions based at least in part on previously-received assertion-related instructions that were received with respect to an assertion received from another user with respect to the reliability requirement in relation to instructions for another device.

In some embodiments, the received assertion-related instructions can comprise a string value comprising the assertion-related instructions. In some embodiments, the assertion-related instructions can comprise a hash of the assertion-related instructions. In some embodiments, the assertion-related instructions can comprise a hash of a file that includes the assertion-related instructions. In some embodiments, the hash of the file that includes the assertion-related instructions is generated based at least in part on the CAT. In some embodiments, the received assertion-related instructions comprise metadata associated with the assertion-related instructions.

The reliability ensurer 106 generates the code verification ERR at stage 212 based, at least in part, on the CAT and the assertion-related instructions at stage 212. For example, in some embodiments, the reliability ensurer 106 can apply an encryption function to the CAT and the assertion-related instructions. In some embodiments, the reliability ensurer 106 can generate the code verification ERR based at least in part on metadata associated with the assertion-related instructions. In some embodiments, the reliability ensurer 106 can generate a code verification ERR based at least in part on an assertion and assertion-related instructions.

Figure 4:
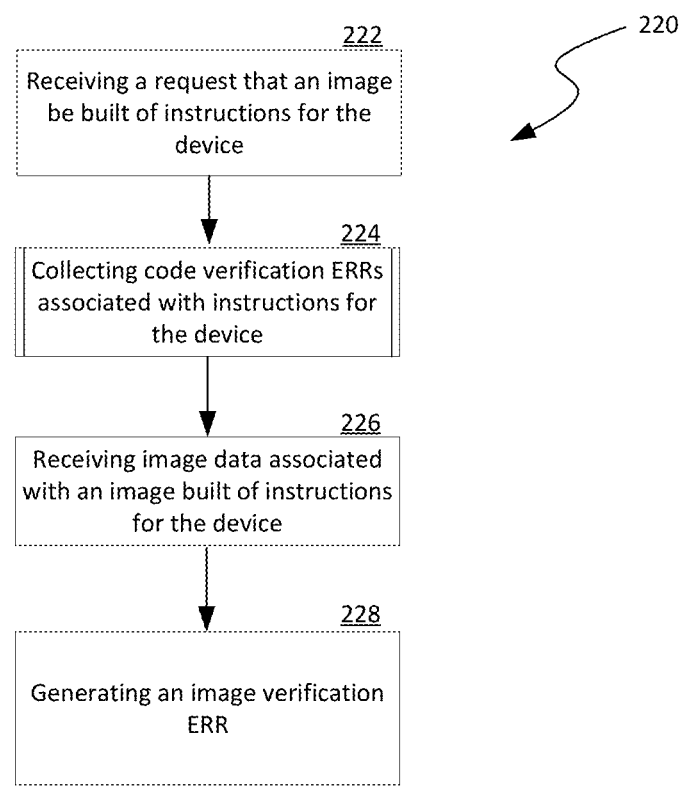
FIG. 4 is a flowchart illustrating various processes of generating an image verification ERR in accordance with embodiments of the disclosed technology.

FIG. 4 is a flowchart illustrating a process 220 of generating an image verification ERR in accordance with embodiments of the disclosed technology. Even though various embodiments of the process 200 are described below with reference to the computing system 100 of FIGS. 1A-1H and the software components of FIGS. 2A and 2B, in other embodiments, the process 220 can also be performed with other suitable types of computing frameworks, systems, components, or modules.

As shown in FIG. 4, the process 220 can include receiving a request that an image be built of instructions for a target device at stage 222. The process can include collecting code verification ERRs associated with instructions for the target device at stage 224. The collected code verification ERRs may have been generated in relation to reliability requirements addressed by developers of instructions for the target device during a collaborative development process. Embodiments of collecting code verification ERRs, including verifying the collected code verification ERRs, are described in more detail below with reference to FIG. 6.

The process can then include receiving image data associated with an image built of instructions for the device at stage 226. For example, in some embodiments, the reliability ensurer 106 can be configured to receive a hash associated with the build of the image from a build or testing system. In some embodiments, image data can comprise metadata associated with the instructions and/or image of the instructions. In some embodiments, image data can comprise test files and other output files or other data from the build process.

The process can then include generating an image verification ERR at stage 228. In some embodiments, the reliability ensurer can be configured to generate the image verification ERR based at least in part on the code verification ERRs associated with the instructions for the device used for generating the image and the received image data. In some embodiments, the image verification ERR can comprise an output of an encryption function that receives an input of a concatenation of code verification ERRs associated with the instructions for the device used for generating the image and the received image data. In some embodiments, the image verification ERR can be generated based at least in part on metadata associated with the instructions and/or the image of the instructions.

In some embodiments, the reliability ensurer 106 can be configured to generate an image verification ERR based at least in part on test files or other output from the build process for generating the image. In some embodiments, the image verification ERRs generated based at least in part on test files or other output from the build process can be linked to assertions and reliability requirements associated with an image of the instructions. For example, in some embodiments, a reliability requirement may be related to performance of an image of instructions, and the reliability ensurer 106 can be configured to receive an assertion from a developer with regard to the reliability requirement, and an image verification ERR can be generated based at least in part on a CAT generated by the reliability ensurer 106 in response to the received assertion and the test file generated from the build process.

Figure 5:
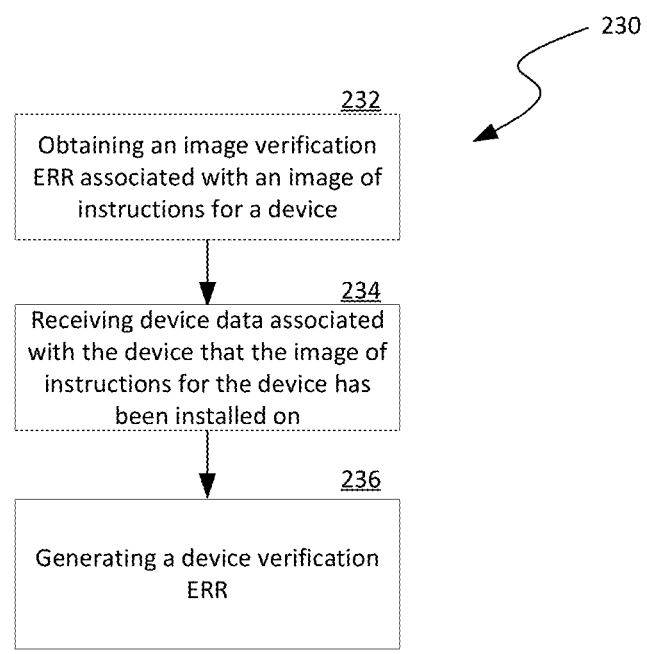
FIG. 5 is a flowchart illustrating various processes of generating a device verification ERR in accordance with embodiments of the disclosed technology.

FIG. 5 is a flowchart illustrating a process 230 of generating a device verification ERR in accordance with embodiments of the disclosed technology. Even though various embodiments of the process 230 are described below with reference to the computing system 100 of FIGS. 1A-1H and the software components of FIGS. 2A and 2B, in other embodiments, the process 230 can also be performed with other suitable types of computing frameworks, systems, components, or modules.

As shown in FIG. 5, the process 230 can include obtaining an image verification ERR associated with an image of instructions for a device at stage 232. The process 230 can then include receiving device data associated with the device that the image of instructions for the device has been installed on at stage 234. In some embodiments, device data can comprise an identifier for the device. For example, device data can comprise a MAC address. In some embodiments, device data can include metadata associated with the device and/or the image.

The process 230 can then include generating a device verification ERR based at least in part on the image verification ERR and the device data at stage 236. In some embodiments, the device verification ERR can be generated based at least in part by encrypting a concatenation of the image verification ERR and the device data. In some embodiments, the device verification ERR can be generated based at least in part on the image verification ERR and the device data, including metadata associated with the device.

Figure 6:
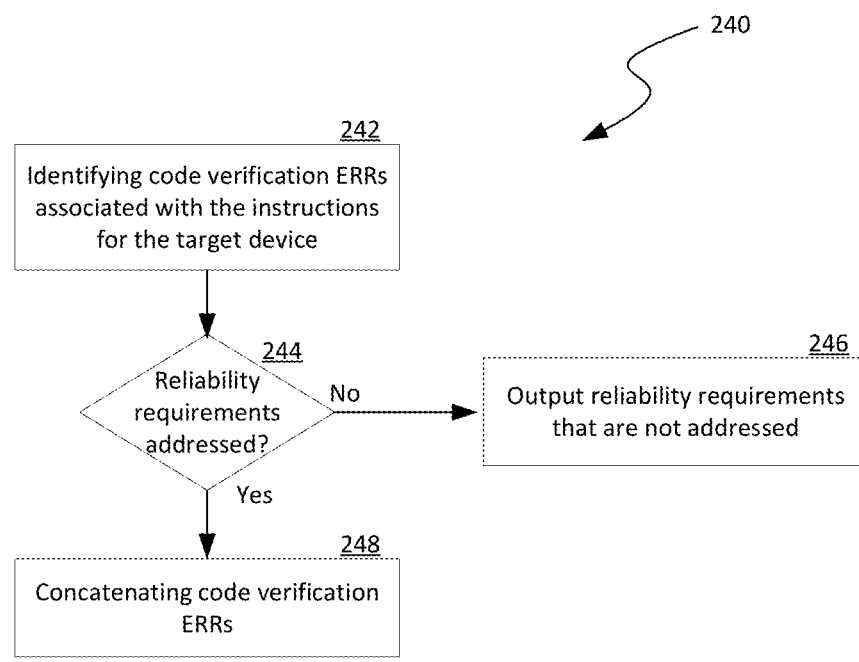
FIG. 6 is a flowchart illustrating various processes of ensuring reliability of device instructions in accordance with embodiments of the disclosed technology.

FIG. 6 is a flowchart illustrating a process 240 of collecting code verification ERRs in accordance with embodiments of the disclosed technology. Even though various embodiments of the process 240 are described below with reference to the computing system 100 of FIGS. 1A-1H and the software components of FIGS. 2A and 2B, in other embodiments, the process 240 can also be performed with other suitable types of computing frameworks, systems, components, or modules. In some embodiments, the process 240 can be performed at stage 224 of FIG. 4, comprising collecting code verification ERRs associated with instructions for the device.

As shown in FIG. 6, the process 240 can comprise identifying code verification ERRs associated with instructions for the target device at stage 242. In some embodiments, the reliability ensurer 106 can be configured to identify code verification ERRs associated with instructions based at least in part on identifying code verification ERRs generated based on a latest generated CAT associated with each of multiple reliability requirements associated with the instructions for the target device. For example, in some embodiments, a reliability requirement can be associated with multiple code verification ERRs that have been generated at different times for the reliability requirement. For instance, after a code verification ERR has been generated with respect to a reliability requirement, assertion-related instructions may change, and a developer may re-address a reliability requirement by submitting a new assertion in relation to the reliability requirement, receiving a newly generated CAT based at least in part on the new assertion, and generating a new code verification ERR based at least in part on the newly generated CAT and the assertion-related instructions identified by the developer. Accordingly, in some embodiments, a code verification ERR generated using a most recently-generated CAT can verify that the reliability requirement has been addressed.

The process 240 can then include a decision stage 244 to determine whether the reliability requirements for the instructions for the device have been addressed. In some embodiments, the reliability ensurer 106 can be configured to determine whether a reliability requirement has been addressed based at least in part on a comparison between the code verification ERR associated with the latest-generated CAT for the reliability requirement and a newly-generated code verification ERR using the latest-generated CAT and a current copy of the assertion-related instructions. When the stored code verification ERR associated with the reliability requirement does not match the newly-generated code verification ERR, the reliability ensurer 106 can then determine that the reliability requirement is not addressed. The reliability ensurer 106 can verify the code verification ERRs associated with each reliability requirement associated with the instructions for the target device being built.

If the reliability ensurer 106 determines that any reliability requirement is not addressed, the process 240 can proceed to stage 246, and the reliability ensurer 106 can output reliability requirements that are determined to have not been addressed. In some embodiments, the reliability ensurer 106 can generate an alert, via a user interface, comprising an indication that the instructions used for generating the image are not reliable. In some embodiments, the reliability ensurer 106 can send a command to a developer device to halt installation of an image on a target device in response to determining that the instructions used for generating the image are not reliable.

If the reliability ensurer 106 determines that all reliability requirements have been addressed, the process 240 can proceed to stage 248, and the code verification ERRs can be concatenated for generating the image verification ERR.

Figure 7:
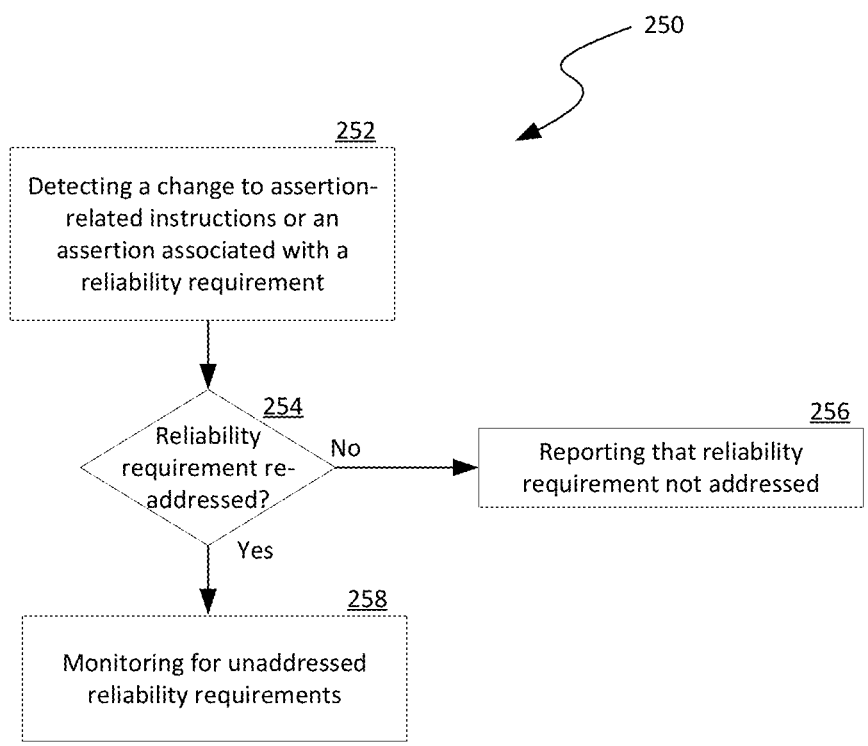
FIG. 7 is a flowchart illustrating various processes of detecting whether device instructions are reliable in accordance with embodiments of the disclosed technology.

FIG. 7 is a flowchart illustrating a process 250 of detecting and reporting an unaddressed reliability requirement that is associated with instructions for a target device, in accordance with embodiments of the disclosed technology. Even though various embodiments of the process 250 are described below with reference to the computing system 100 of FIGS. 1A-1H and the software components of FIGS. 2A and 2B, in other embodiments, the process 250 can also be performed with other suitable types of computing frameworks, systems, components, or modules.

As shown in FIG. 7, the process 250 can include detecting a change to assertion-related instructions or an assertion associated with a reliability requirement. For example, after an assertion has already been received for the reliability requirement and a code verification ERR generated, the reliability ensurer 106 can monitor the reliability requirement for a new assertion received from a developer in relation to the reliability requirement and/or a change in assertion-related instructions that were used for generating the code verification ERR.

The process can then include a decision stage 254 to determine whether the reliability requirement has been readdressed by a developer. In some embodiments, the reliability requirement is readdressed when the reliability ensurer 106 receives a new assertion with regard to the reliability requirement, a new CAT is generated, assertion-related instructions are received from a developer in relation to the new CAT, and a new code verification ERR is generated. In some embodiments, the reliability requirement is readdressed when the reliability ensurer 106 receives the changed assertion-related instructions in association with the already-generated CAT and generates a new code verification ERR based on the already-generated CAT and changed assertion-related instructions. In some embodiments, when either a new assertion has been received with regard to the reliability requirement and a new CAT has been generated, but no assertion-related instructions have been received, or when a change has been detected in assertion-related instructions and no new assertion has been received or the changed assertion-related instructions have not been received in relation to the previously-generated CAT, the reliability ensurer 106 can determine that the reliability requirement is unaddressed.

The process 250 can then include reporting that the reliability requirement is not addressed at stage 256 when the reliability requirement has not been readdressed by a developer.

The process 250 can include monitoring reliability requirements for an unaddressed reliability requirement at stage 258.

Figure 8:
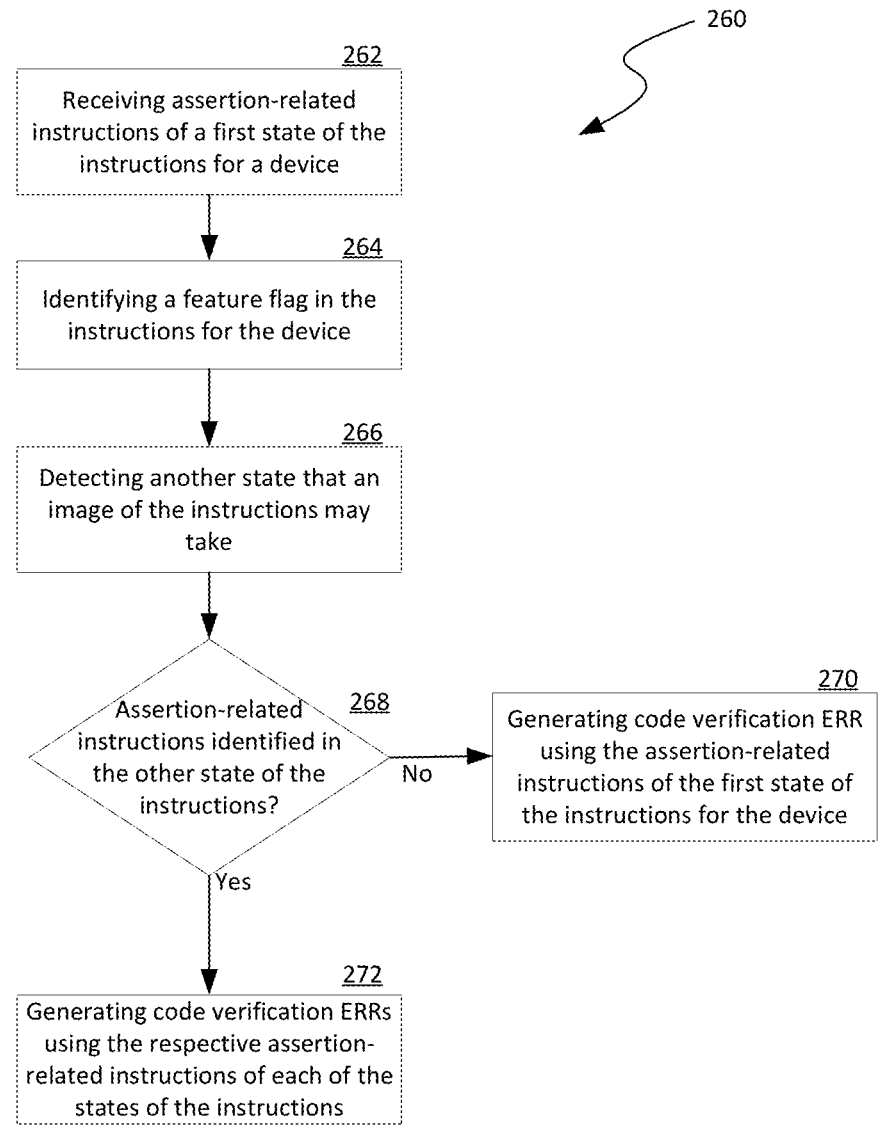
FIG. 8 is a flowchart illustrating various processes of generating a code verification ERR for device instructions having two or more states in accordance with embodiments of the disclosed technology.

FIG. 8 is a flowchart illustrating a process 260 of generating a code verification ERR when a second state of instructions is detected in accordance with embodiments of the disclosed technology. Even though various embodiments of the process 260 are described below with reference to the computing system 100 of FIGS. 1A-1H and the software components of FIGS. 2A and 2B, in other embodiments, the process 260 can also be performed with other suitable types of computing frameworks, systems, components, or modules.

As shown in FIG. 8, the process 260 can comprise receiving assertion-related instructions of a first state of the instructions for a device at stage 262. For example, the reliability ensurer 106 can receive an assertion from a developer with respect to a reliability requirement and generate a CAT based on the received assertion. The reliability ensurer 106 can then receive assertion-related instructions associated with the received CAT, the assertion-related instructions identified by a developer of the instructions for the target device.

The process 260 can then include identifying a feature flag in the instructions for the device at stage 264. For example, the ensurer agent 109 can search for and identify a feature flag in the instructions for the device. Based on identifying the feature flag, the process 260 can proceed to detecting another state that an image of the instructions may take based at least in part on the feature flag. For example, the ensurer agent 109 can identify all states that an image of the instructions may take. In some embodiments, an image of the instructions can take multiple different states.

The process can then include a decision stage 268, and the ensurer agent 109 can determine whether there are assertion-related instructions in instructions for the other state that an image of the instructions may take. For example, the ensurer agent 109 can search for the assertion-related instructions in instructions associated with the other state that an image of the instructions may take. In some embodiments, instructions for the device in the other state that the image may take may comprise encrypted instructions. The ensurer agent 109 can be configured to encrypt the assertion-related instructions of the first state of the instructions and search the encrypted instructions of the other state of the instructions based on the encrypted assertion-related instructions. When the ensurer agent 109 does not identify the assertion-related instructions in instructions associated with the other state that an image of the instructions may take, the process 260 proceeds to a stage 270, and the reliability ensurer 106 can generate a code verification ERR using the assertion-related instructions of the first state of the instructions for the device. An image of the instructions may take more than two states, and the reliability ensurer can search for the assertion-related instructions in instructions associated with each of the more than two states.

When the ensurer agent 109 does identify the assertion-related instructions in the other state of the instructions, the process 260 proceeds to a stage 272, and the reliability ensurer 106 can generate a code verification ERR using the assertion-related instructions of each of the states of the instructions.

Figure 9:
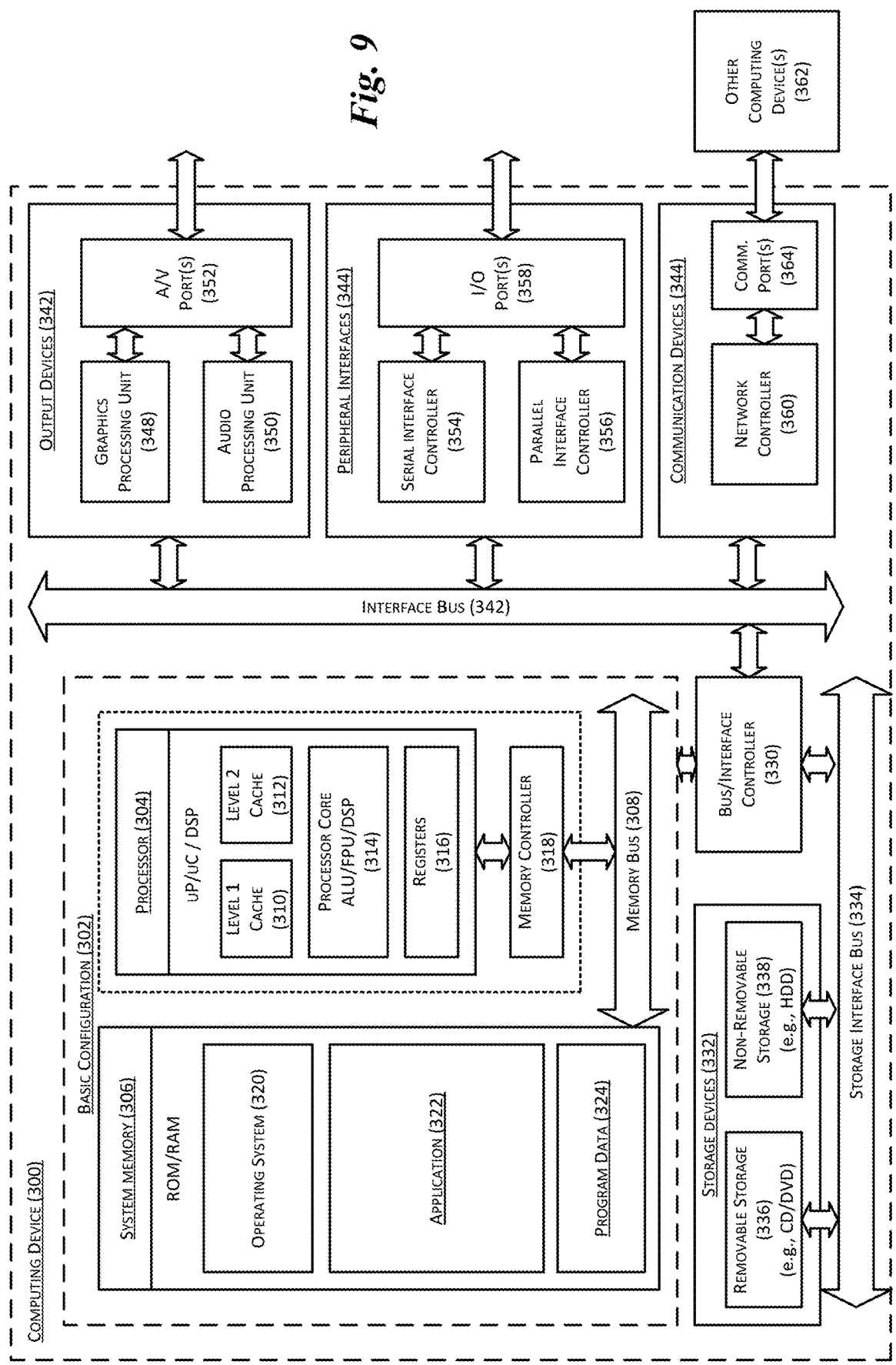
FIG. 9 is a computing device suitable for certain components of the computing system in FIGS. 1A-1H.

FIG. 9 is a computing device 300 suitable for certain components of the computing system 100 in FIGS. 1A-1H. For example, the computing device 300 can be suitable for the reliability ensurer 106, the developer devices 102, the third party device 103, or target device 107 of FIGS. 1A-1H. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one or more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and transitory communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a network-connected video camera, a drone, a cell phone, a personal data assistant (PDA), a personal media player device, a wireless web-watch device, a personal headset device, a vehicle navigation device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of verifying reliability of instructions for a device, the method performed by a computing system comprising a processor and a memory, the method comprising:
   identifying a reliability requirement associated with instructions for a device;
   receiving, from a user via a user device, an assertion in relation to the reliability requirement;
   generating a cryptographic assertion tracer (CAT) based at least in part on the received assertion;
   transmitting the CAT to the user device;
   receiving, from the user device, identification of assertion-related instructions from a first copy of the instructions for the device, in association with the CAT;
   generating a first code verification encrypted reproducible record (ERR) based at least in part on the CAT and the identified assertion-related instructions from the first copy of instructions for the device;
   sending the first code verification ERR to a third party;
   reporting that the reliability requirement is addressed;
   receiving a second copy of the instructions for the device;
   receiving a request from the third party to determine whether the reliability requirement is addressed in the second copy of the instructions for the device, the request including the first code verification ERR;
   generating a second code verification ERR based at least in part on the CAT and the identified assertion-related instructions from the second copy of the instructions for the device;
   comparing the first and second code verification ERRs, and
   when the first and second code verification ERRs do not match, based on the comparison, reporting that the reliability requirement is not addressed.

2. The method of claim 1, wherein the assertion comprises a first assertion, the CAT comprises a first CAT, and the assertion-related instructions comprise a first assertion-related instructions, wherein the method further comprises:
   receiving a second assertion in relation to the reliability requirement;
   generating a second CAT based at least in part on the received second assertion;
   determining whether a second assertion-related instructions have been received in association with the second CAT; and
   when no second CAT has been received, reporting that the reliability requirement is not addressed.

3. The method of claim 1, further comprising:
   receiving image data associated with an image built using the second copy of the instructions for the device; and
   when the first and second code verification ERRs do match, generating an image verification ERR based at least in part on the first or second code verification ERR and the image data.

4. The method of claim 3, further comprising:
   receiving device data associated with an installation device to which the image of the instructions has been installed; and
   generating a device verification ERR based at least in part on the device data and the image verification ERR.

5. The method of claim 3, further comprising:
   receiving a request that the built image be installed on an installation device;
   sending a request to an approval party for approval to install the built image of instructions on the installation device, wherein the request comprises the image verification ERR and code verification ERRs associated with reliability requirements associated with instructions for the device;
   receiving approval from the approval party to install the built image of instructions on the installation device; and
   approving the installation of the built image on the installation device.

6. The method of claim 1, further comprising:
   receiving image data associated with an image built using the second copy of the instructions for the device;
   receiving a request that the built image be installed on an installation device; and
   when the second code verification ERR and the first code verification ERR do not match, rejecting the request that the built image be installed on the installation device.

7. The method of claim 1, wherein the CAT comprises a hash of a string value comprising the assertion.

8. The method of claim 1, wherein the assertion-related instructions are received from a first state that an image of the instructions may take, wherein the method further comprises:
   identifying a feature flag and/or configuration in the instructions;
   detecting a second state that the image of the instructions may take based on the feature flag and/or configuration;
   comparing the assertion-related instructions received from the first state that the image of the instructions may take with instructions of the second state that the image of the instructions may take;
   identifying the assertion-related instructions in the instructions of the second state that the image of the instructions may take;
   receiving the CAT and the assertion-related instructions of the second state; and
   generating a third code verification ERR based at least in part on the CAT and the assertion-related instructions of the second state.

9. The method of claim 3, wherein the image verification ERR is generated based at least in part on inputting a concatenation of the first or second code verification ERR and image data in an encryption function.

10. The method of claim 4, wherein the device verification ERR is generated based at least in part on inputting a concatenation of the image verification ERR and the device data in an encryption function.

11. The method of claim 1, wherein generating the first code verification ERR comprises inputting a concatenation of the CAT and the received assertion-related instructions in an encryption function.

12. The method of claim 4, wherein the device data comprises a device identifier, and wherein the method further comprises:
   receiving a request from an auditing user for a reliability report for the device, the request comprising the device identifier;
   identifying the device verification ERR based on the device identifier;
   identifying the image verification ERR based on the device verification ERR;
   identifying the first or second code verification ERR based on the image verification ERR; and
   outputting a status regarding whether the reliability requirement associated with the first or second code verification ERR is addressed.

13. A method for verifying reliability of instructions for a device, the method performed by a computing system comprising a processor and a memory, the method comprising:
- displaying, via a user interface, a reliability requirement associated with instructions for a device;
- receiving, from a user via the user interface, an assertion in relation to the reliability requirement;
- generating a cryptographic assertion tracer (CAT) based at least in part on the received assertion;
- receiving, from the user, an identification of assertion-related instructions in a first copy of the instructions for the device to associate with the CAT;
- generating a first code verification encrypted reproducible record (ERR) based at least in part on the CAT and the identified assertion-related instructions in the first copy of the instructions for the device;
- receiving a second copy of the instructions for the device;
- generating a second code verification ERR based at least in part on the CAT and the identified assertion-related instructions in the second copy of the instructions for the device;
- comparing the first and second code verification ERRs; and
- when the first and second code verification ERRs do not match, based on the comparison, reporting that the reliability requirement is not addressed.

14. The method of claim 13, wherein generating a first code verification ERR comprises encrypting the assertion and the assertion-related instructions.

15. The method of claim 13, further comprising:
- when the first and second code verification ERRs do match, generating an image verification ERR comprising the first or second code verification ERRs and image data associated with an image built of the instructions.

16. The method of claim 15, further comprising:
- generating a device verification ERR comprising the image verification ERR and device data associated with a device the image is installed on.

17. The method of claim 13, wherein the assertion-related instructions comprise a string comprising source code of the instructions for the device.

18. A computing device comprising:
- a processor and a memory containing instructions executable by the processor to cause the processor to perform a process that includes:
  - displaying, via a user interface, a reliability requirement associated with instructions for a device;
  - receiving an assertion in relation to the reliability requirement, the assertion comprising a string value;
  - generating a cryptographic assertion tracer (CAT) based at least in part on the received assertion;
  - receiving a request to associate the CAT and assertion-related instructions from a first copy of the instructions for the device; and
  - generating a first code verification encrypted reproducible record (ERR) based at least in part on the CAT and the associated assertion-related instructions from the first copy of the instructions for the device;
  - receiving a request to determine whether the reliability requirement is addressed in a second copy of the instructions for the device;
  - generating a second code verification ERR based at least in part on the CAT and the assertion-related instructions from the second copy of the instructions for the device;
  - comparing the first and second code verification ERRs; and
  - when the first and second code verification ERRs do not match, based on the comparison, reporting that the reliability requirement is not addressed.

* * * * *